(12) United States Patent
Koganehira et al.

(10) Patent No.: US 11,347,982 B2
(45) Date of Patent: May 31, 2022

(54) LIQUID EJECTING APPARATUS AND ORDERING SYSTEM

(71) Applicant: SEIKO EPSON CORPORATION, Tokyo (JP)

(72) Inventors: Shuichi Koganehira, Matsumoto (JP); Tomoyuki Hirano, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 195 days.

(21) Appl. No.: 16/912,785

(22) Filed: Jun. 26, 2020

(65) Prior Publication Data

US 2020/0410311 A1 Dec. 31, 2020

(30) Foreign Application Priority Data

Jun. 28, 2019 (JP) .............................. JP2019-120953

(51) Int. Cl.
*G06K 15/00* (2006.01)
*B41J 2/175* (2006.01)
*B41J 29/393* (2006.01)
*G06Q 30/06* (2012.01)

(52) U.S. Cl.
CPC ...... *G06K 15/4075* (2013.01); *B41J 2/17506* (2013.01); *B41J 2/17566* (2013.01); *B41J 29/393* (2013.01); *G06Q 30/0633* (2013.01); *B41J 2002/17589* (2013.01)

(58) Field of Classification Search
CPC .. B41J 2/17523; B41J 2/17509; B41J 2/1752; B41J 2/17506; B41J 2/175; B41J 2/17566; B41J 2002/17573; B41J 2/17503; B41J 2002/17589; B41J 29/393; G06K 15/4075; G06Q 30/0633
See application file for complete search history.

(56) References Cited

U.S. PATENT DOCUMENTS

| 6,223,131 B1 * | 4/2001 | Kanaya | B41J 2/1752 347/86 |
| 2002/0140749 A1 * | 10/2002 | Su | B41J 2/17553 347/7 |
| 2016/0271941 A1 | 9/2016 | Yokoyama et al. | |
| 2016/0279962 A1 * | 9/2016 | Ishida | B41J 2/17566 |

FOREIGN PATENT DOCUMENTS

| JP | 2015-077812 A | 4/2015 |
| JP | 2016-172353 A | 9/2016 |
| JP | 2017-094590 A | 6/2017 |
| JP | 2019-010797 A | 1/2019 |

\* cited by examiner

*Primary Examiner* — Jannelle M Lebron
(74) *Attorney, Agent, or Firm* — Oliff PLC

(57) ABSTRACT

A liquid ejecting apparatus includes a liquid container and a control unit. The liquid container has an upper limit mark. The upper limit mark is arranged so that in a first case where an entire amount of liquid stored in a refilling container is injected into a storage portion when a notification unit notifies of a first state, a liquid level of the liquid in the storage portion is located between an inlet port and the upper limit mark, and in a second case where the entire amount of liquid stored in the refilling container is injected into the storage portion when the notification unit notifies of a second state, the liquid level overlaps with the upper limit mark.

14 Claims, 16 Drawing Sheets

FIG. 11

| COLOR | MODEL NUMBER | PERIODIC PURCHASE | SHIPPING DATE | NUMBER |
|---|---|---|---|---|
| BLACK | T1001 | NO | — | — |
| CYAN | T1002 | YES | 20TH | 1 |
| MAGENTA | T1003 | YES | 20TH | 1 |
| YELLOW | T1004 | YES | 20TH | 1 |

43

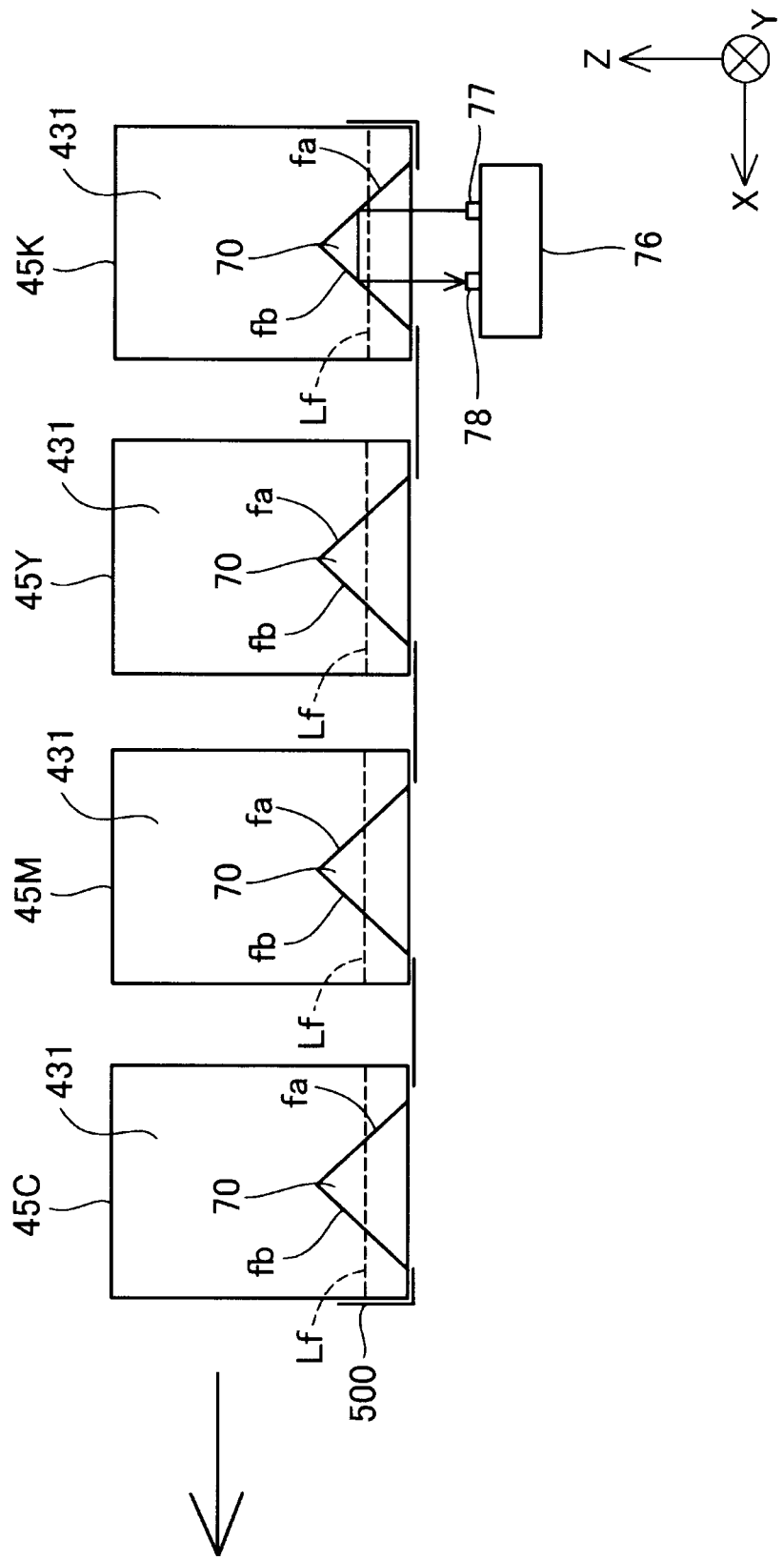

LIQUID EJECTING APPARATUS AND ORDERING SYSTEM

The present application is based on, and claims priority from JP Application Serial Number 2019-120953, filed Jun. 28, 2019, the disclosure of which is hereby incorporated by reference herein in its entirety.

BACKGROUND

1. Technical Field

The present disclosure relates to a technique of refilling a liquid container of an liquid ejecting apparatus with liquid.

2. Related Art

A technique where a liquid ejecting apparatus includes an ink tank having an ink inlet port and a liquid detection means that detects an ink remaining amount in the ink tank has been known (JP-A-2016-172353). The ink tank of the liquid ejecting apparatus has a mark indicating an ink amount in the ink tank.

In the technique described above, when the remaining amount in the ink tank decreases, ink in an ink refilling container is refilled into the ink tank from an ink inlet port. When a user refills the ink tank with the entire ink amount of the ink refilling container, an ink liquid level in the ink tank may be below the mark or the ink may overflow from the ink inlet port depending on the ink amount in the ink refilling container and the remaining amount in the ink tank when the ink is refilled. In this case, there may be a risk of giving the user a sense of uneasiness that the ink tank is not sufficiently refilled with ink and a sense of uneasiness that there is a risk that the ink overflows from the ink inlet port during refilling of the ink. Such a problem is not limited to the liquid ejecting apparatus including an ink tank, but common to liquid ejecting apparatuses that store various liquids.

SUMMARY

According to one form of the present disclosure, a liquid ejecting apparatus is provided. The liquid ejecting apparatus includes a head that discharges liquid, a liquid container that supplies the liquid to the head, and a control unit that controls operation of the liquid ejecting apparatus. The liquid container has a storage portion that can store the liquid, an inlet port for injecting the liquid of a refilling container different from the liquid container from the refilling container to the storage portion, and an upper limit mark that indicates an upper limit of a liquid level of the liquid stored in the storage portion. The control unit has a remaining amount detection unit that detects a remaining amount of the liquid stored in the storage portion, a determination unit that determines whether the remaining amount of the liquid in the storage portion is in a first state where the remaining amount is smaller than or equal to a first threshold value or in a second state where the remaining amount is smaller than or equal to a second threshold value smaller than the first threshold value by using a detection result of the remaining amount detection unit, and a notification unit that notifies outside whether the remaining amount is in the first state or in the second state according to a determination result of the determination unit. The upper limit mark is arranged so that in a first case where an entire amount of the liquid stored in the refilling container is injected into the storage portion when the notification unit notifies of the first state, a liquid level of the liquid in the storage portion is located between the inlet port and the upper limit mark, and in a second case where the entire amount of the liquid stored in the refilling container is injected into the storage portion when the notification unit notifies of the second state, the liquid level overlaps with the upper limit mark.

BRIEF DESCRIPTION OF THE DRAWINGS

FIG. 11 is a diagram for explaining customer data.

FIG. 17 is a second diagram for explaining detection of the liquid remaining amount using the optical detection unit.

DESCRIPTION OF EXEMPLARY EMBODIMENTS

A. First Embodiment

Figure 1:
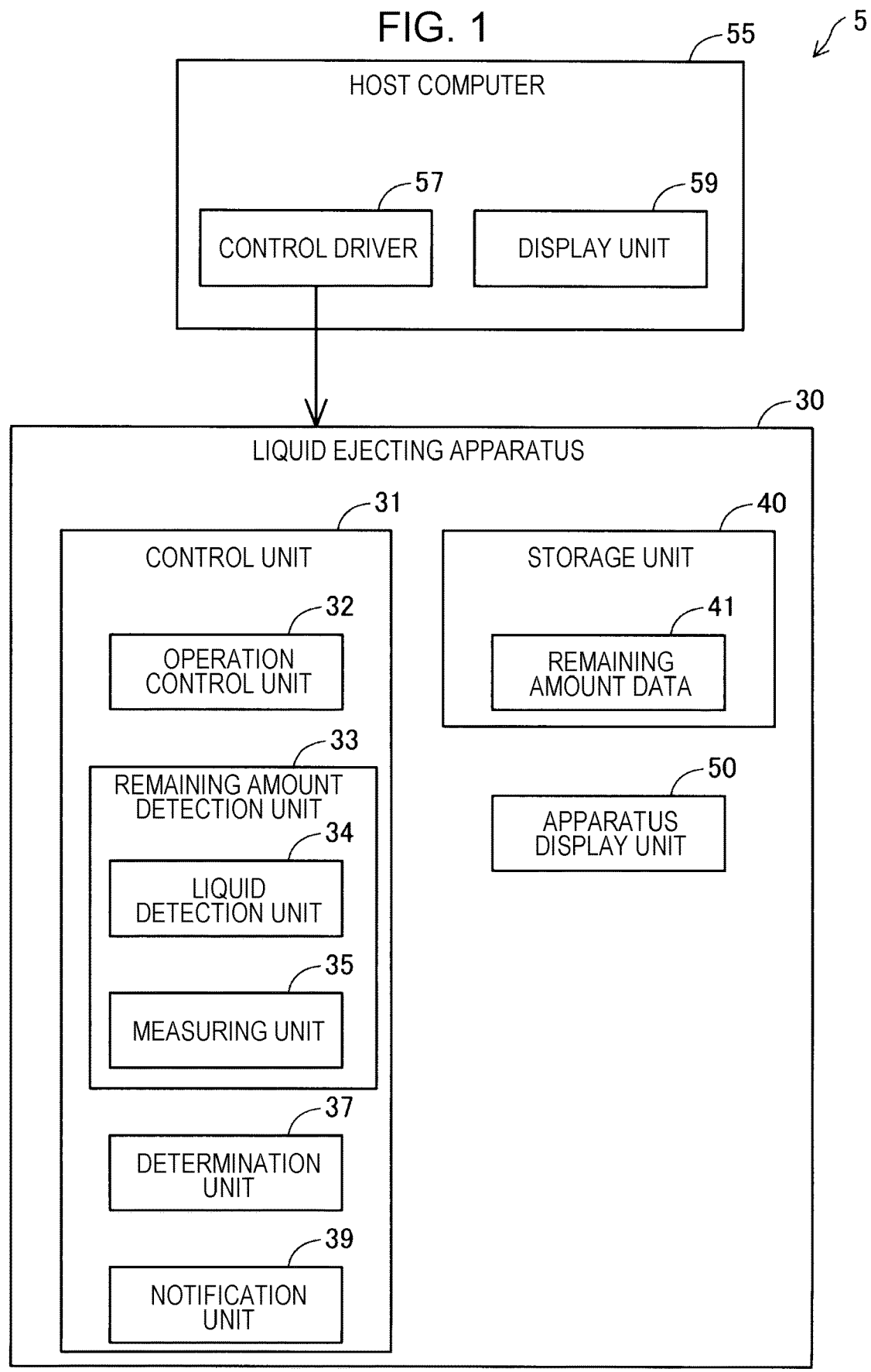
FIG. 1 is a block diagram for explaining a liquid ejecting system of a first embodiment of the present disclosure.
Figure 2:
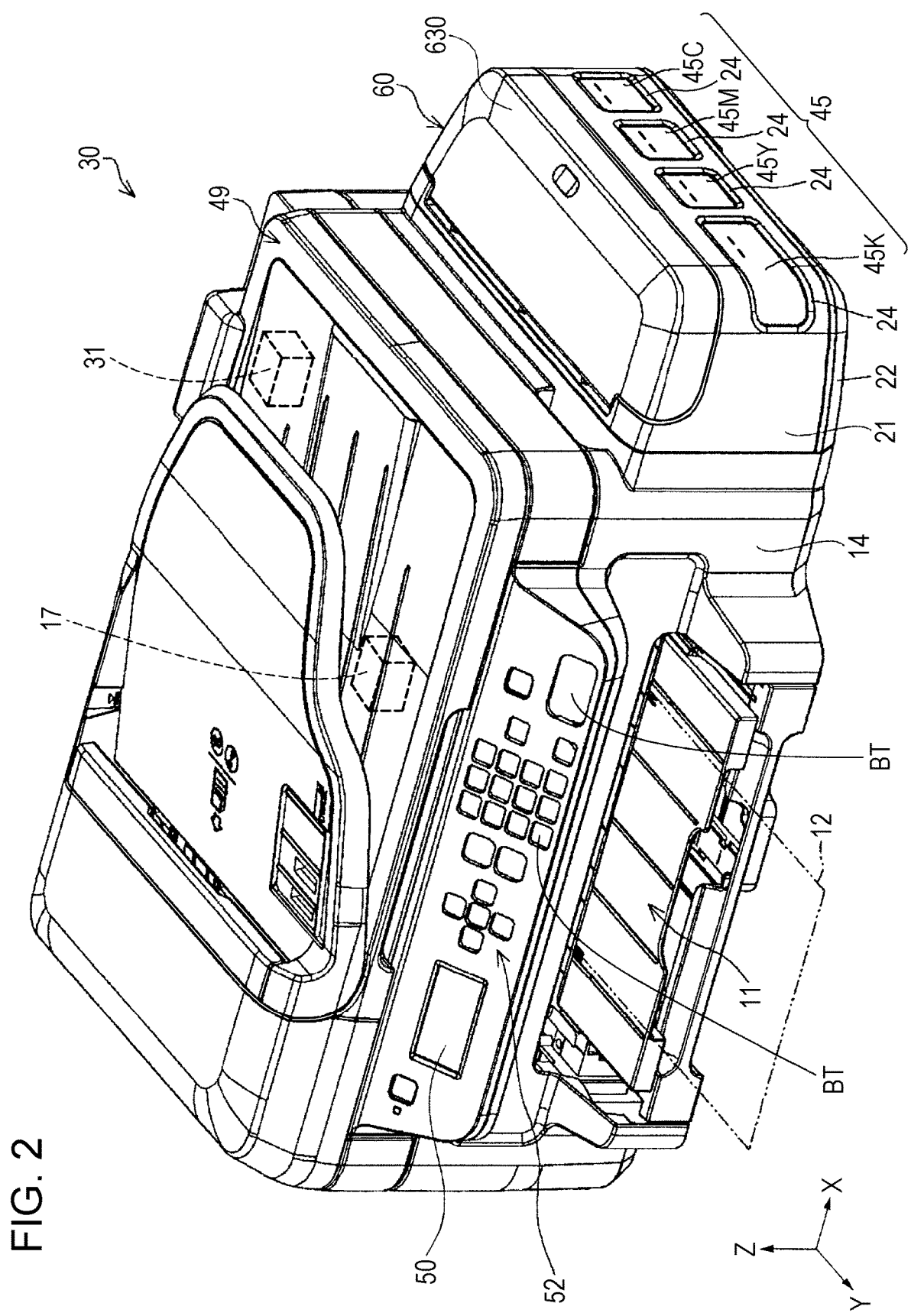
FIG. 2 is an external view of a liquid ejecting apparatus included in the liquid ejecting system.
Figure 3:
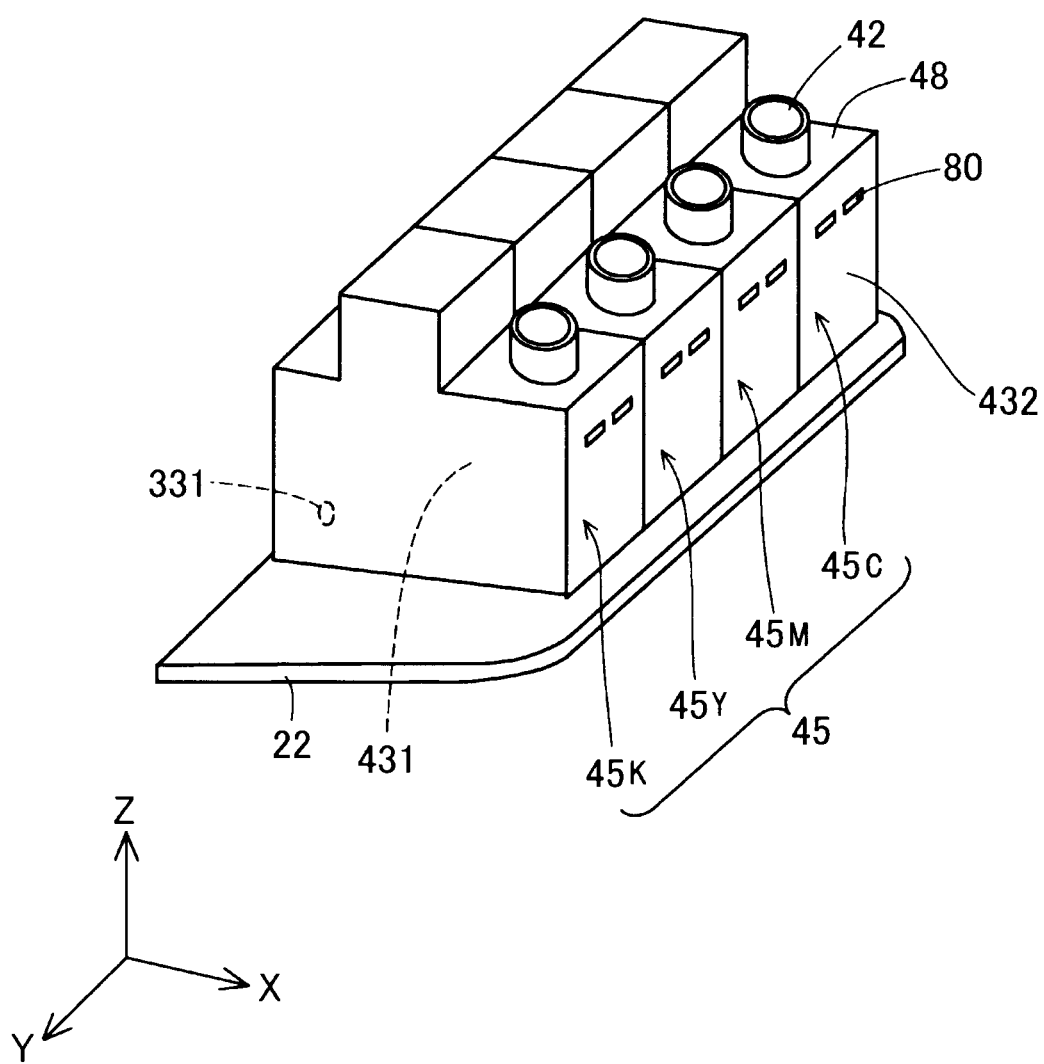
FIG. 3 is an external perspective view of a liquid container arranged on a unit bottom portion.
Figure 4:
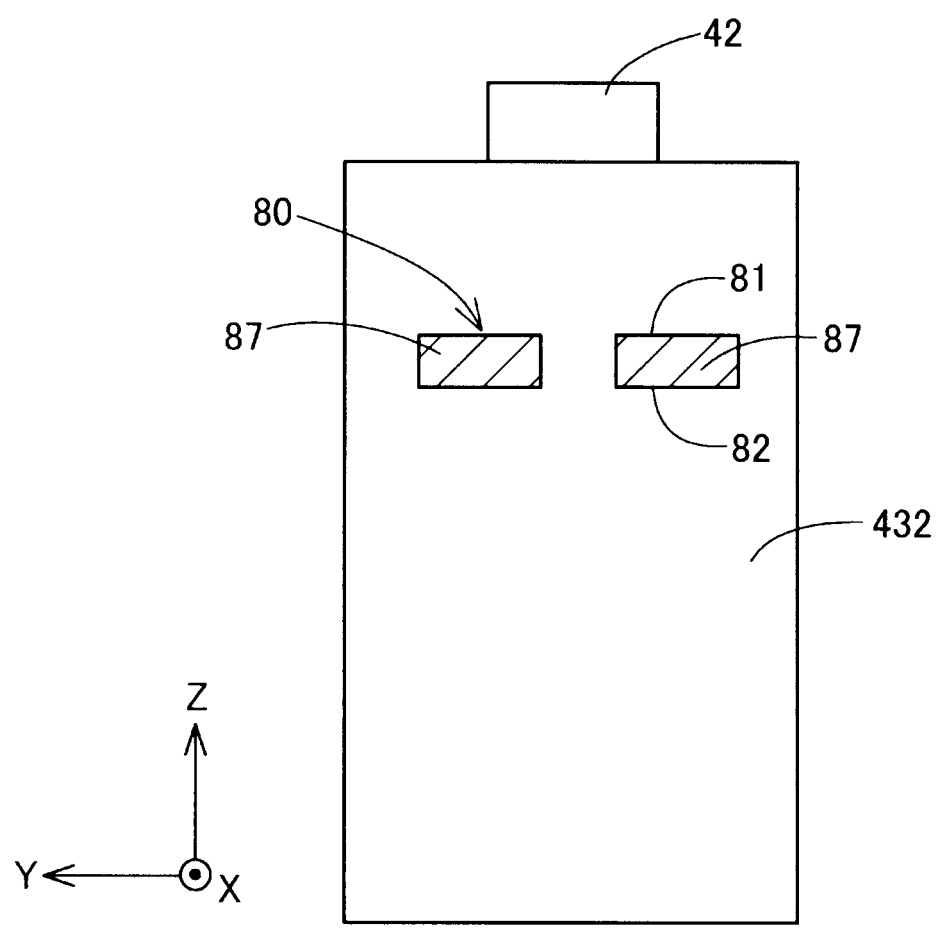
FIG. 4 is a diagram schematically showing a first side wall of the liquid container.
Figure 5:
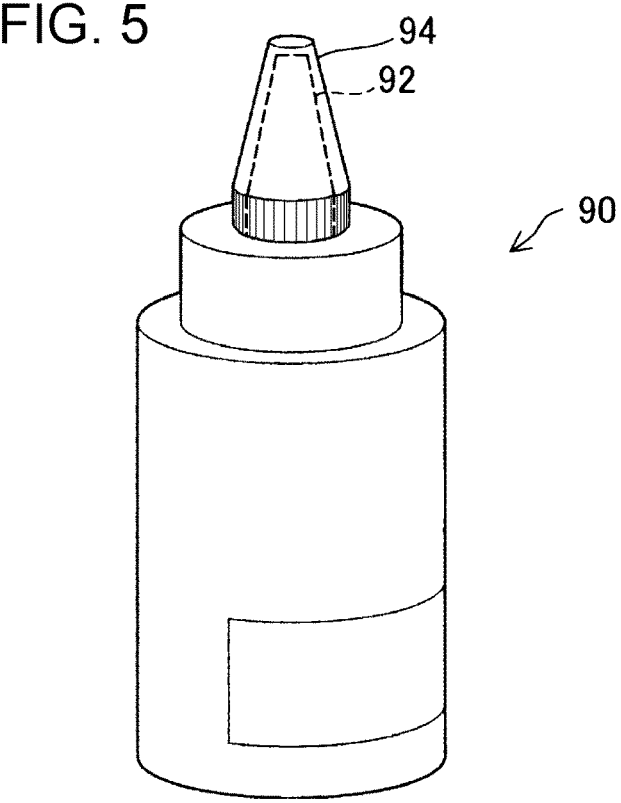
FIG. 5 is an external view of a refilling container.

FIG. 1 is a block diagram for explaining a liquid ejecting system 5 of a first embodiment of the present disclosure. FIG. 2 is an external view of a liquid ejecting apparatus 30 included in the liquid ejecting system 5. FIG. 3 is an external perspective view of a liquid container 45 arranged on a unit bottom portion 22. FIG. 4 is a diagram schematically showing a first side wall 432 of the liquid container 45. FIG. 5 is an external view of a refilling container 90. In FIGS. 2 to 4, an X direction, a Y direction, and a Z direction perpendicular to each other are shown. In the other drawings, the X direction, the Y direction, and the Z direction are shown as needed. As shown in FIG. 2, for example, the liquid ejecting apparatus 30 is arranged in a horizontal surface parallel to the X direction and the Y direction. The Z direction is a direction along the vertical direction. A +Z direction is an upward direction and a −Z direction is a downward direction.

As shown in FIG. 1, the liquid ejecting system 5 includes a host computer 55 and the liquid ejecting apparatus 30. In the present embodiment, the liquid ejecting apparatus 30 is an ink jet printer.

As shown in FIG. 2, the liquid ejecting apparatus 30 includes an apparatus main body 49 and a liquid container unit 60. The apparatus main body 49 has an outer shell having a substantially rectangular parallelepiped shape. A control unit 31, a head 17 that discharges liquid to a medium 12 such as a paper sheet, a drive mechanism for driving the head 17, and the like are provided in the apparatus main body 49. The head 17 has nozzles for discharging liquid to the medium 12.

A front surface of the apparatus main body 49 is provided with an operation unit 52 and a discharge unit 11. The operation unit 52 receives an input from a user to perform various operations of the liquid ejecting apparatus 30 and displays a status of the liquid ejecting apparatus 30. The operation unit 52 includes various buttons BT such as a power button and a setting button and an apparatus display unit 50. The apparatus display unit 50 is, for example, a touch panel. The apparatus display unit 50 can receive an input from the user. The discharge unit 11 discharges the medium 12 after being printed.

The liquid container unit 60 includes a unit cover 21, a cover opening/closing portion 630, the unit bottom portion 22, and a plurality of liquid containers 45. The liquid container unit 60 is attached to a side wall of the apparatus main body 49. Each of the plurality of liquid containers 45 supplies liquid to the head 17. The plurality of liquid containers 45 is composed of a liquid container 45K that stores black ink, a liquid container 45Y that stores yellow ink, a liquid container 45M that stores magenta ink, and a liquid container 45C that stores cyan ink. The plurality of liquid containers 45 is stored in the unit cover 21. Each of the plurality of liquid containers 45 supplies liquid to the head 17 through a tube or the like. When the four liquid containers 45C, 45M, 45Y, and 45K are used without discriminating them, the liquid container 45 is used. The four liquid containers 45C, 45M, 45Y, and 45K have the same shape and can store the same amount of liquid. In the other embodiments, the four liquid containers 45C, 45M, 45Y, and 45K may be able to store different amounts of liquid and may have different shapes.

The unit cover 21 has window sections 24 formed of a transmissive material. Four window sections 24 are provided corresponding to the four liquid containers 45C, 45M, 45Y, and 45K, respectively. The user can visually recognize the amounts of liquid of the liquid containers 45C, 45M, 45Y, and 45K from outside through the window sections 24.

As shown in FIG. 3, the liquid container 45 includes a storage portion 431 that can store liquid and an inlet port 42 for injecting liquid into the storage portion 431. The inlet port 42 is a cylindrical member protruding from an upper wall 48 of the storage portion 431. A detachable plug member may be attached to the inlet port 42.

The liquid container 45 has the first side wall 432 that is a part of a wall that delimits the storage portion 431 and an upper limit mark 80 indicating an upper limit of a liquid level of the liquid stored in the storage portion 431. The first side wall 432 is a wall along the Z direction in a state where the liquid ejecting apparatus 30 is installed on a horizontal surface. The first side wall 432 is formed of a transparent or translucent member. A part of the first side wall 432 is arranged in a position facing the window sections 24 shown in FIG. 2. Thereby, the user can confirm the remaining amount of the liquid in the storage portion 431 by visually recognizing the first side wall 432 through the window sections 24.

As shown in FIG. 4, the upper limit mark 80 is a mark extending in the horizontal direction formed on an external surface of the first side wall 432. The upper limit mark 80 indicates the upper limit of the liquid that can be stored in the storage portion 431. The upper limit mark 80 is arranged lower than a lower end of the inlet port 42. As shown in FIG. 2, the upper limit mark 80 can be visually recognized from the outside through the window sections 24. As shown in FIG. 4, the upper limit mark 80 is composed of two line members 87 extending in the Y direction that is the horizontal direction with a gap in between. The upper limit mark 80 has a fixed thickness in the Z direction. Specifically, the upper limit mark 80 has a lower end line 82 and an upper end line 81.

When refilling the liquid container 45 with liquid, the user exposes the upper sides of the plurality of liquid containers 45 by opening the cover opening/closing unit 630. The user refills the storage portion 431 with liquid of the refilling container 90 from the exposed inlet port 42. When refilling the storage portion 431 with liquid, the upper limit mark 80 indicates the upper limit of the liquid that can be stored in the storage portion 431. As shown in FIG. 3, the liquid container 45 has a liquid delivery member 331 that delivers the liquid of the storage portion 431 to the head 17. The liquid delivery member 331 communicates with the head through a tube or the like.

As shown in FIG. 5, the refilling container 90 stores liquid to fill the liquid container 45. The refilling container 90 is manufactured for each type of the liquid ejecting apparatus 30 and for each of the liquid containers 45C, 45M, 45Y, and 45K. A predetermined amount of liquid is stored in the refilling container 90. The user refills the liquid container 45 with liquid from the refilling container 90 by removing a cap 94 of the refilling container 90 and inserting a delivery port 92 into the inlet port 42.

As shown in FIG. 1, the liquid ejecting apparatus 30 includes the control unit 31, a storage unit 40, and the apparatus display unit 50. The control unit 31 executes various programs stored in the storage unit 40. The control unit 31 includes an operation control unit 32, a remaining amount detection unit 33, a determination unit 37, and a notification unit 39.

The operation control unit 32 controls various operations of the liquid ejecting apparatus 30. For example, the operation control unit 32 moves the head 17 according to print data transmitted from the host computer 55.

The remaining amount detection unit 33 detects the remaining amount of liquid stored in the storage portion 431 of the liquid container 45. In the present embodiment, the remaining amount detection unit 33 has a liquid detection unit 34 and a measuring unit 35. The liquid detection unit 34 detects the presence or absence of the liquid stored in the storage portion 431 by using a sensor member included in the liquid container 45. A state where there is no liquid detected by the liquid detection unit 34 means a state where the liquid remaining amount is small. A detection method by the liquid detection unit 34 will be described later.

The measuring unit 35 measures the amount of liquid discharged from the head 17 for each color liquid. Specifically, the measuring unit 35 measures the amount of liquid discharged from the head 17 by multiplying the number of times when the head 17 discharges liquid by the amount of liquid [mg] discharged by one discharge. The same amount of liquid as that discharged from the head 17 is supplied from the liquid container 45 to the head 17. Therefore, the amount of liquid discharged from the head 17 can be regarded as a consumed amount of liquid in the liquid container 45. Thereby, the measuring unit 35 can calculate the liquid remaining amount by subtracting the consumed amount of liquid from a filled amount [mg] in the liquid container 45. The filled amounts of the liquid containers 45C, 45M, 45Y, and 45K are predetermined values and are stored in the storage unit 40 for each of the liquid containers 45C, 45M, 45Y, and 45K. The predetermined values are set based on, for example, the volumes [mm$^3$] of the storage portions 431 of the liquid containers 45C, 45M, 45Y, and 45K and the densities [mg/mm$^3$] of the stored liquids. In this way, the remaining amount detection unit 33 includes the liquid detection unit 34 and the measuring unit 35, so that the remaining amount detection unit 33 can more accurately detect the remaining amount of liquid in the liquid container 45.

The determination unit 37 determines whether the remaining amount of liquid is in a first state or in a second state for each of the liquid containers 45C, 45M, 45Y, and 45K by using a detection result of the remaining amount detection unit 33. The first state is a state where the remaining amount of the liquid in the storage portion 431 is smaller than or equal to a predetermined first threshold value. In the present embodiment, the first state is a ink low state where the remaining amount of liquid is small. The first state is a state to be a trigger for prompting the user to refill the liquid container 45 with liquid. The first threshold value may be a value different for each of the liquid containers 45C, 45M, 45Y, and 45K or may be the same value. The second state is a state where the remaining amount of the liquid in the storage portion 431 is smaller than or equal to a second threshold value smaller than the first threshold value. In the present embodiment, it is preferable that the second threshold value is set to a value where air bubbles are prevented from being mixed into the liquid delivery member 331 of the liquid container 45. The second state becomes a trigger for notifying the user of ink end where there is no liquid in the liquid container 45. Detailed contents of the determination unit 37 will be described later. In the present embodiment, it is determined whether the remaining amount of liquid is in the first state or in the second state by using a detection result of the liquid detection unit 34 and a measuring result of the measuring unit 35. Details of the above will be described later.

The notification unit 39 notifies the outside whether the remaining amount of liquid is in the first state or in the second state according to a determination result of the determination unit 37. In the present embodiment, for example, the notification unit 39 displays an image indicating that the remaining amount of liquid is in the first state or in the second state on a display unit 59 of the host computer 55.

The storage unit 40 is composed of a ROM, a RAM, or the like. The storage unit 40 stores remaining amount data 41. The remaining amount data 41 is a remaining amount in the storage portion 431 calculated by the control unit 31 by using at least one of the detection result of the liquid detection unit 34 and the measuring result of the measuring unit 35. In other words, the remaining amount data 41 stores the remaining amount of liquid, which is the detection result of the remaining amount detection unit 33, as a detected remaining amount. The remaining amount data 41 is stored in the storage unit 40 for each of the liquid containers 45C, 45M, 45Y, and 45K.

The host computer 55 is, for example, a personal computer. The host computer 55 includes a control driver 57 and the display unit 59. The control driver 57 is a printer driver, which is software for controlling operations of the liquid ejecting apparatus 30 and the display unit 59. The control driver 57 acquires various information from the liquid ejecting apparatus 30 and causes the display unit 59 to display the various information as needed. The various information is information related to the remaining amount of liquid for each of the liquid containers 45C, 45M, 45Y, and 45K. In other words, the display unit 59 can display whether the liquid container 45 is in the first state or in the second state. The display unit 59 is, for example, a liquid crystal panel. The display unit 59 may be a touch panel.

Figure 6:
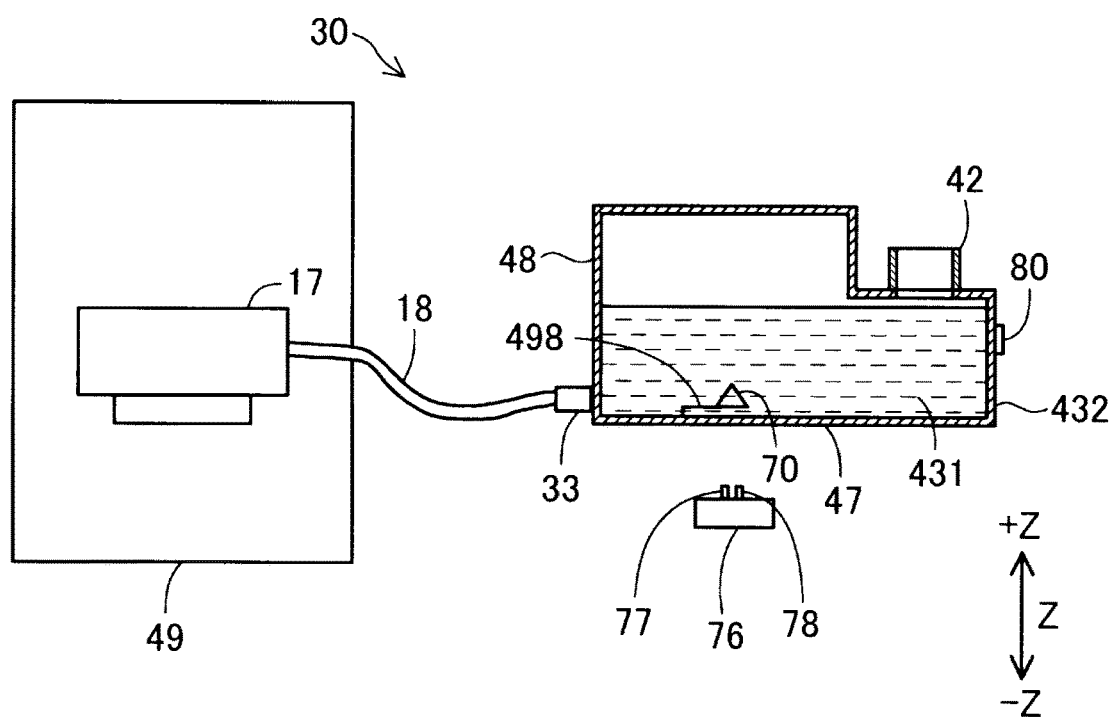
FIG. 6 is a diagram for further explaining the liquid ejecting apparatus.

FIG. 6 is a diagram for further explaining the liquid ejecting apparatus 30. Each of the liquid containers 45C, 45M, 45Y, and 45K has a detection member 70 in the storage portion 431. The detection member 70 is used to detect the presence or absence of the liquid stored in the storage portion 431 of the liquid containers 45C, 45M, 45Y, and 45K. In the present embodiment, the detection member 70 is a prism. The detection member 70 may be arranged on an inner surface of a bottom wall 47 of the storage portion 431, which is in contact with the storage portion 431, or may be arranged in a position separated from the inner surface of the bottom wall 47 as in the present embodiment. In the case of the present embodiment, the detection member 70 is supported by a support member 498, so that the detection member 70 is arranged in a position higher than the inner surface of the bottom wall 47 and in a position lower than the upper limit mark 80.

The liquid ejecting apparatus 30 further includes an optical detection unit 76. The optical detection unit 76 is arranged in a housing composed of the unit cover 21, the unit bottom portion 22, and the cover opening/closing unit 630. Specifically, four optical detection units 76 are respectively provided to the liquid containers 45C, 45M, 45Y, and 45K. The four optical detection units 76 are arranged below the corresponding liquid containers 45C, 45M, 45Y, and 45K. Although the liquid ejecting apparatus 30 has four optical detection units 76 corresponding to the four liquid containers 45C, 45M, 45Y, and 45K, the liquid ejecting apparatus 30 may have, for example, one optical detection unit 76. In this case, the one optical detection unit 76 is configured to be able to move in an arrangement direction of the liquid containers 45C, 45M, 45Y, and 45K, and when detecting the remaining amount of the liquid in the liquid container 45, the one optical detection unit 76 moves to below the liquid container 45 where the remaining amount is detected.

The optical detection unit 76 has a light emitting element 77 that emits light to the detection member 70 and a light receiving element 78 that receives reflection light reflected by the detection member 70. The optical detection unit 76 is electrically coupled to the control unit 31. The control unit 31 optically detects the liquid remaining amount by emitting light to the detection member 70 by using the light emitting element 77. In a first case where the periphery of the detection member 70 is filled with liquid, the light emitted from the light emitting element 77 diffuses inside the liquid. On the other hand, in a second case where the liquid is supplied to the head 17 from the liquid delivery member 331 through a tube 18, the liquid level of the storage portion 431 drops, and the periphery of the detection member 70 is not filled with liquid, the light emitted from the light emitting element 77 is reflected by the detection member 70. Therefore, the intensity of light received by the light receiving element 78 in the second case is greater than that in the first case. Thereby, the liquid detection unit 34 of the control unit 31 can detect the presence or absence of the liquid stored in the liquid container 45 according to the intensity of the light received by the light receiving element 78.

Here, in each of the four liquid containers 45C, 45M, 45Y, and 45K, the detection member 70 is arranged at a predetermined height position so that the light emitted to the detection member 70 by the light emitting element 77 is reflected by the detection member 70 when the liquid remaining amount becomes the first threshold value. However, a specific liquid container 45 may be arranged to be inclined due to an arrangement order of the four liquid containers 45C, 45M, 45Y, and 45K or the like. In the present embodiment, the liquid container 45K that stores black ink is arranged to be inclined. Thereby, when the liquid detection unit 34 detects the presence or absence of the liquid in the liquid containers 45C, 45M, 45Y, and 45K by using the detection member 70, the liquid detection unit 34 detects that there is no liquid remaining amount in the liquid container 45K when the liquid remaining amount in the liquid container 45K is greater than the first threshold value. That is, regarding the liquid container 45K, when the liquid remaining amount is greater than the first threshold value, the periphery of the detection member 70 is not filled with liquid. On the other hand, regarding the other liquid containers 45C, 45M, and 45Y, the liquid detection unit 34 detects that there is no liquid remaining amount in the liquid container when the liquid remaining amount in the liquid container is the first threshold value.

Figure 7:
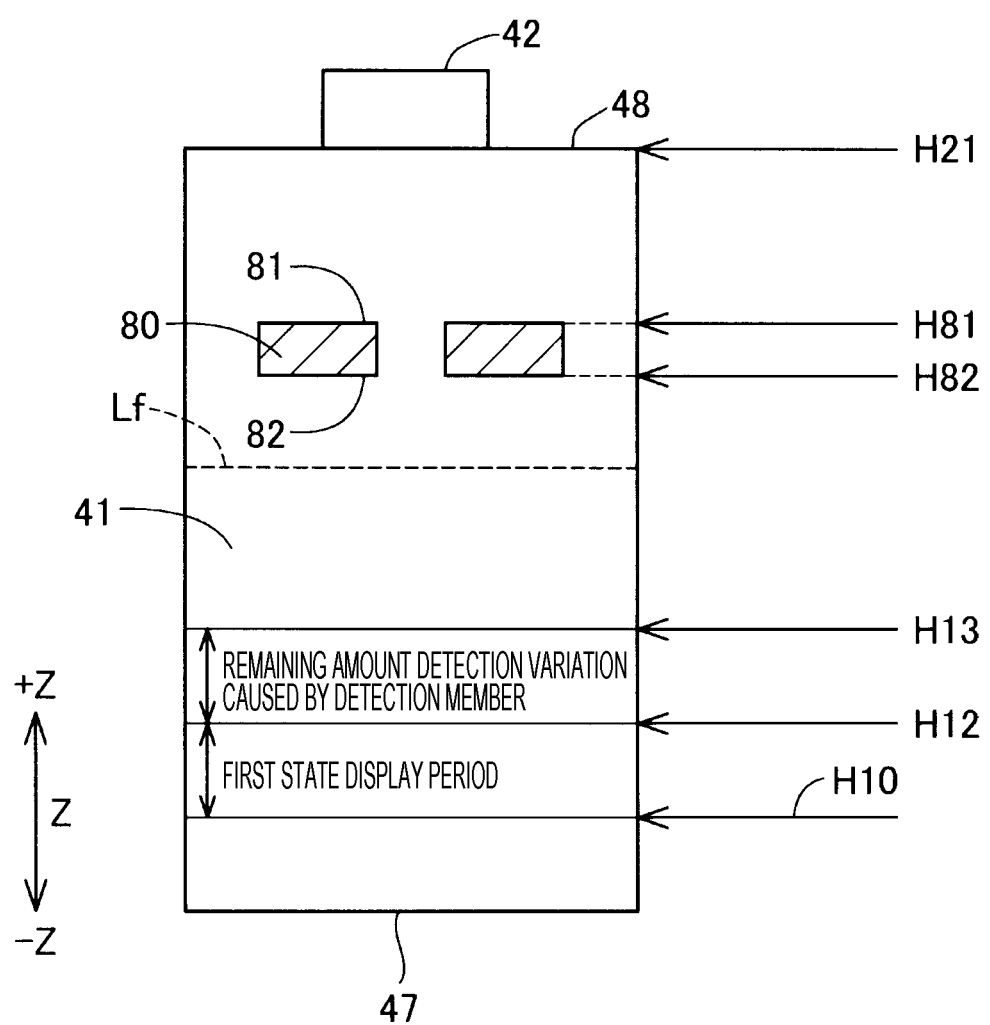
FIG. 7 is a diagram for explaining a relationship between a liquid level of a storage portion and a liquid remaining amount in the storage portion.
Figure 8:
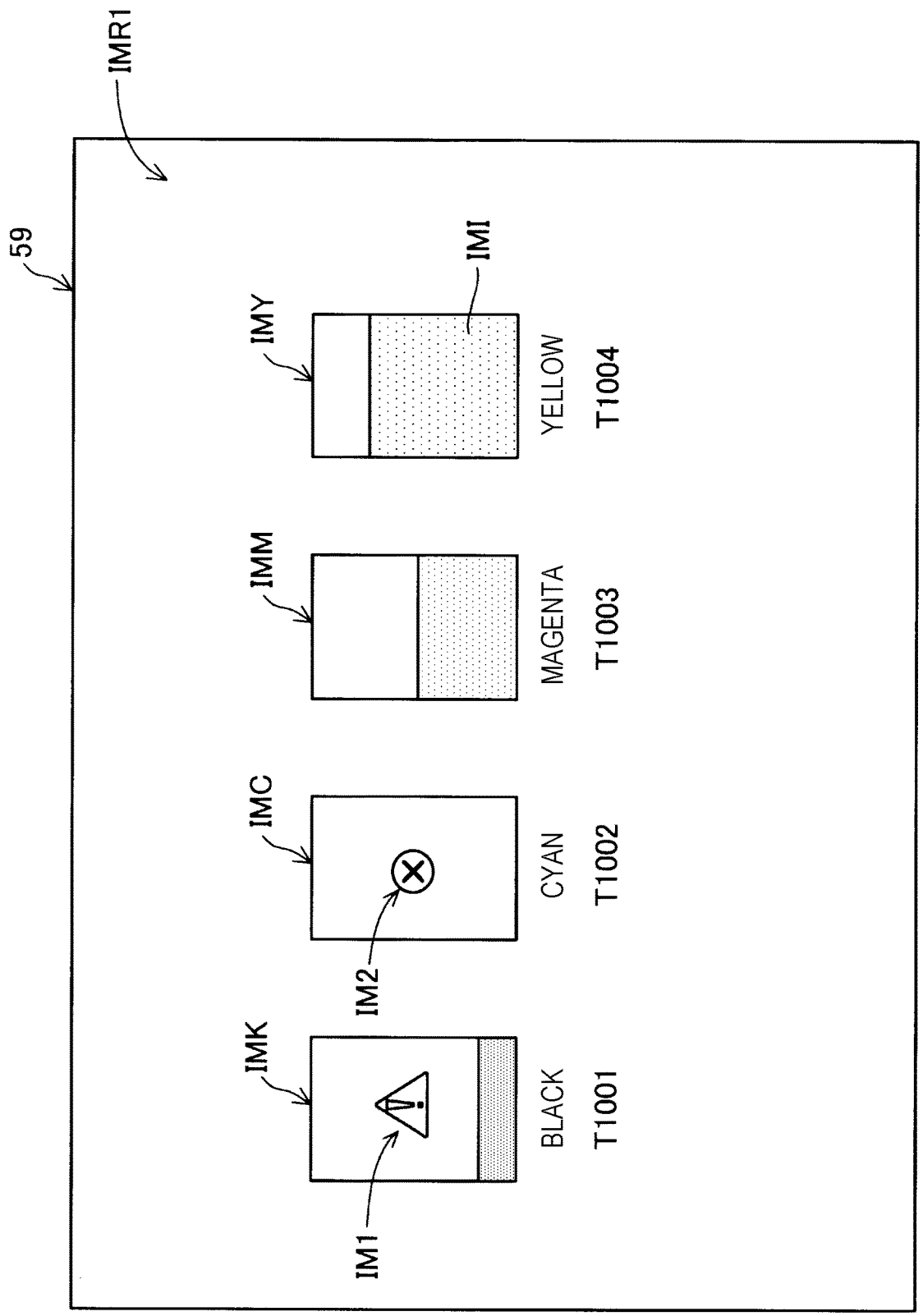
FIG. 8 is a first diagram showing a display image of the liquid remaining amount displayed on a display unit.
Figure 9:
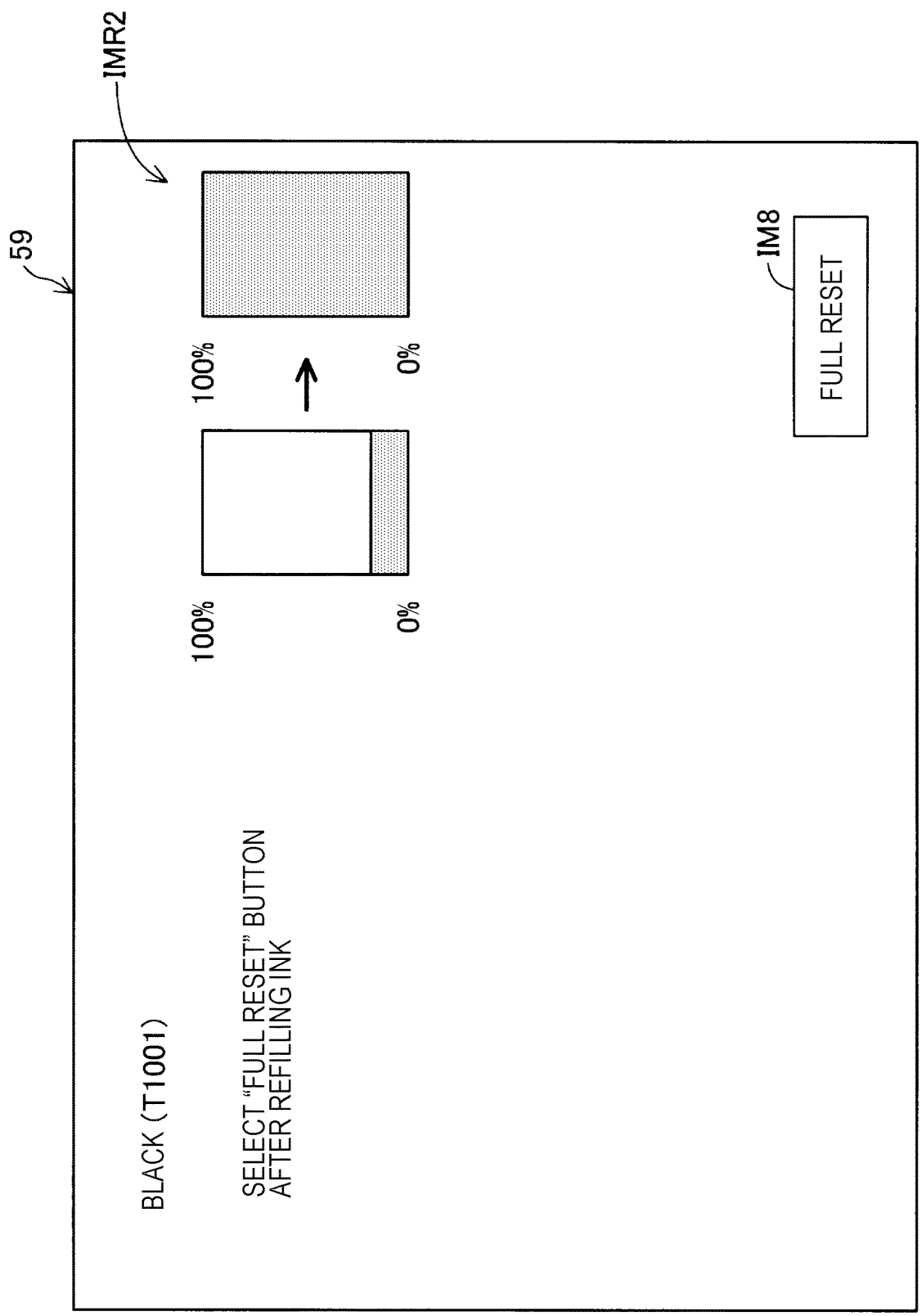
FIG. 9 is a second diagram showing a display image of the liquid remaining amount displayed on the display unit.

FIG. 7 is a diagram for explaining a relationship between the liquid level of the storage portion 431 of the liquid container 45 and the liquid remaining amount in the storage portion 431. The height used to explain FIG. 7 is a height based on the bottom wall 47. FIG. 8 is a first diagram showing a display image of the liquid remaining amount displayed on the display unit 59. FIG. 9 is a second diagram showing a display image of the liquid remaining amount displayed on the display unit 59.

As shown in FIG. 7, when the liquid is consumed and a liquid level Lf drops, in the liquid container 45K, the liquid detection unit 34 detects that there is no liquid remaining amount in a case where the liquid level becomes a height H13. On the other hand, regarding the other liquid containers 45C, 45M, and 45Y, when the liquid level Lf becomes a height H12, the liquid detection unit 34 detects that there is no liquid remaining amount. That is, the amount of liquid stored between the height H13 and the height H12 corresponds to the amount of variation of remaining amount detection due to the detection member 70. A height H21 is a height of injection limit where there is a high possibility that liquid overflows from the inlet port 42 when the liquid container 45 is further refilled with liquid. The height H21 is a height where the upper wall 48 of the liquid container 45 to which the inlet port 42 is coupled is located. A height H81 is a height position where the upper end line 81 of the upper limit mark 80 is located. A height H82 is a height position where the lower end line 82 of the upper limit mark 80 is located.

In the present embodiment, the determination unit 37 determines that the remaining amount of the liquid in the storage portion 431 is the first threshold value when the liquid level of any one of the four liquid containers 45C, 45M, 45Y, and 45K lastly reaches the height H12 where the liquid detection unit 34 detects that there is no liquid remaining amount. That is, regarding the liquid containers 45C, 45M, and 45Y, the determination unit 37 determines that the liquid container is in the first state when the liquid detection unit 34 detects no remaining amount where there is no liquid remaining amount. On the other hand, regarding the liquid container 45K, the determination unit 37 determines that the liquid container is in the first state when the liquid detection unit 34 detects no remaining amount where there is no liquid remaining amount and when the consumed amount of liquid in the liquid container 45 measured by the measuring unit 35 after time point of the no remaining amount detection reaches a predetermined first amount. The predetermined first amount is set to the same amount as the amount of liquid stored between the height H13 and the height H12 in the storage portion 431.

The determination unit 37 determines that the remaining amount of liquid in the four liquid containers 45C, 45M, 45Y, and 45K is in the second state by the method described below. That is, regarding the liquid containers 45C, 45M, and 45Y, the determination unit 37 determines that the remaining amount of liquid is in the second state when the consumed amount of liquid measured by the measuring unit 35 reaches a predetermined second amount from a time point when the liquid detection unit 34 detects that there is no remaining amount, that is, a time point when the determination unit 37 determines that the liquid container is in the first state. The second amount is set to the same amount as the amount of liquid stored between the height H12 and the height H10 in the storage portion 431. When the liquid level Lf is at the height H10, the remaining amount of the liquid in the storage portion 431 is the second threshold value. Regarding the liquid container 45K, the determination unit 37 determines that the liquid container is in the second state when the consumed amount of liquid measured by the measuring unit 35 reaches the predetermined second amount from a time point when the determination unit 37 determines that the remaining amount of liquid is in the first state by using the detection result of the liquid detection unit 34 and the measuring result of the measuring unit 35. That is, the determination unit 37 determines the second state of each of the plurality of the liquid containers 45C, 45M, 45Y, and 45K based on the remaining amount of liquid in the liquid containers 45C, 45M, and 45Y, which are used as a specific liquid container among the plurality of liquid containers 45C, 45M, 45Y, and 45K. The specific liquid container is a liquid container for the liquid detection unit 34 to detect that the liquid lastly stored in the storage portion 431 is absent among the plurality of liquid containers 45C, 45M, 45Y, and 45K. As described above, the determination unit 37 determines the second state of the plurality of liquid containers 45C, 45M, 45Y, and 45K based on the remaining amount of liquid in the liquid containers 45C, 45M, and 45Y, which are used as a specific liquid container whose liquid level height of the storage portion 431 is the lowest at a time point when the liquid detection unit 34 detects that there is no liquid among the plurality of liquid containers 45C, 45M, 45Y, and 45K. By doing so, in the plurality of liquid containers 45C, 45M, 45Y, and 45K, it is possible to suppress variation of the liquid remaining amount at a time point when it is determined to be in the second state.

As described above, for the liquid containers 45C, 45M, and 45Y, the determination unit 37 determines the first state by using the detection result of the liquid detection unit 34 and determines the second state by using the detection result of the liquid detection unit 34 and the measuring result of the measuring unit 35. For the liquid container 45K, the determination unit 37 determines whether it is in the first state or in the second state by using the detection result of the liquid detection unit 34 and the measuring result of the measuring unit 35.

As shown in FIG. 8, when the determination unit 37 determines whether it is in the first state or in the second state, the notification unit 39 causes the display unit 59 to display that the liquid container 45 is in the first state or in the second state through the control driver 57. In the present embodiment, different images are displayed on the display unit 59 for the first state and the second state, respectively, so that the first state and the second state are notified to the outside. The notification unit 39 may additionally display a state of liquid remaining amount in the liquid containers 45 that are not in the first state or the second state through the control driver 57. For example, a state display image IMR1 is displayed on the display unit 59. The state display image IMR1 has a first container image IMK, a second container image IMC, a third container image IMM, and a fourth container image IMY. The first container image IMK is a vertically long rectangular image schematically showing the liquid container 45K. The second container image IMC is a vertically long rectangular image schematically showing the liquid container 45C. The third container image IMM is a vertically long rectangular image schematically showing the liquid container 45M. The fourth container image IMY is a vertically long rectangular image schematically showing the liquid container 45Y. Below the first container image IMK to the fourth container image IMY, character images representing the colors of liquids and model numbers of the refilling containers 90 used for the liquid containers 45C, 45M, 45Y, and 45K are displayed.

The remaining amount of liquid is schematically shown by a remaining amount display image IMI, which is superimposed on each of the first container image IMK to the fourth container image IMY. The remaining amount display image IMI changes so as to schematically display that the liquid level drops according to the liquid remaining amount in the liquid container 45 detected by the remaining amount detection unit 33. The remaining amount display image IMI is composed of dots shown in the entire inside of each of the first container image IMK to the fourth container image IMY that have rectangular shapes and a line image forming a dot upper surface mimicking the liquid level Lf. In an initial state where the liquid in the liquid container 45 is not consumed, the remaining amount display image IMI is displayed so as to be shown in the entire inside of each of the first container image IMK to the fourth container image IMY that have rectangular shapes.

The control driver 57 calculates a remaining amount % by using a liquid remaining amount A calculated by the measuring unit 35 and a filled amount B in the liquid container 45. For example, the remaining amount % is represented by the liquid remaining amount A×100/the filled amount B. The control driver 57 schematically displays the liquid remaining amount by representing the remaining amount % as a ratio of the remaining amount display image IMI to the area of each of the first container image IMK to the fourth container image IMY. The liquid remaining amount at the height of the liquid level Lf at which no liquid remaining amount is detected by the liquid detection unit 34 is calculated in advance, and until when the no liquid remaining amount is detected by the liquid detection unit 34, a previously calculated ratio [%] of the liquid remaining amount to the filled amount B may be continuously displayed as the remaining amount display image IMI. After the no liquid remaining amount is detected by the liquid detection unit 34, the remaining amount detection unit 33 calculates the liquid remaining amount by subtracting the consumed amount represented by the measuring result of the measuring unit 35 from the previously calculated liquid remaining amount, and the remaining amount display image IMI may be displayed based on the calculated liquid remaining amount.

When the determination unit 37 determines that the liquid container 45 is in the first state, the notification unit 39 notifies the user that the liquid container 45 is in the first state through the control driver 57. Specifically, the notification unit 39 causes the display unit 59 to superimpose a first state image IM1 on the first container image IMK mimicking the liquid container 45K that is in the first state through the control driver 57. The first state image IM1 is displayed until the liquid remaining amount in the liquid container 45K becomes the second state. Further, the notification unit 39 causes the display unit 59 to superimpose a second state image IM2 on the second container image IMC mimicking the liquid container 45C that is in the second state through the control driver 57. Thereby, the user can easily know the liquid container 45 in the first state where the liquid remaining amount is small and the liquid container 45 in the second state where there is no liquid remaining amount.

Next, an arrangement relation of the upper limit mark 80 will be described with reference to FIG. 7. As shown in FIG. 7, in the first case where the entire amount of liquid stored in the refilling container 90 is injected into the storage portion 431 when the liquid level Lf becomes the height H12 and the notification unit 39 notifies of the first state, the upper limit mark 80 is arranged so that the liquid level Lf of the storage portion 431 is located between the inlet port 42 and the upper limit mark 80 in the Z direction. The entire amount of liquid stored in the refilling container 90 is a concept including a tolerance. Specifically, the detection member 70 is arranged in a position where the determination unit 37 can determine the first state so that the liquid level Lf is located between the inlet port 42 and the upper limit mark 80 even when a maximum storage amount obtained by adding an amount generated from the tolerance to a designed storage amount of the refilling container 90 is injected into the storage portion 431. By doing so, when injecting liquid into the liquid container 45 in a case where the liquid container 45 becomes the first state, even if the maximum storage amount of liquid is injected due to the tolerance from the refilling container 90 to the storage portion 431, it is possible to reduce the possibility that the liquid overflows from the inlet port 42.

In the second case where the entire amount of liquid stored in the refilling container 90 is injected into the storage portion 431 when the notification unit 39 notifies of the second state, the upper limit mark 80 is arranged so that the liquid level Lf overlaps with the upper limit mark 80 in the Z direction.

As shown in FIG. 9, for example, when the user selects the first container image IMK to be an object which the user refills with liquid by using a cursor or the like, a detailed image IMR2 of the first container image IMK is displayed. In the detailed image IMR2, a refilling completion image IM8 that receives an input indicating that the liquid refilling is completed is displayed. When the user selects the refilling completion image IM8, the control driver 57 transmits completion information indicating that the refilling of the liquid container 45 is completed to the control unit 31 of the liquid ejecting apparatus 30. The control unit 31 that has received the completion information rewrites the remaining amount data 41 of the liquid container 45 where the refilling is completed into a state indicating 100% which is the entire amount and stores the rewritten data in the storage unit 40.

Here, a predetermined amount of liquid is stored in the refilling container 90. However, the storage amount may be slightly different from the predetermined amount due to manufacturing variation and the like. Therefore, even when variation occurs in the amount of liquid stored in the refilling container 90, an effect described below is achieved by having the arrangement relation described above. In a case in which the first state or the second state of the liquid container 45 is notified, when the user injects the entire amount of liquid stored in the refilling container 90 into the liquid container 45, the liquid level Lf of the liquid container 45 is located at a position higher than or equal to the lower end line 82 of the upper limit mark 80 and lower than the height H21 of injection limit. Thereby, it is possible to reduce a risk of giving the user a sense of uneasiness that the liquid container 45 is not sufficiently refilled with liquid and a sense of uneasiness that there is a risk that the liquid overflows from the inlet port 42 during refilling of liquid.

B. Second Embodiment

Figure 10:
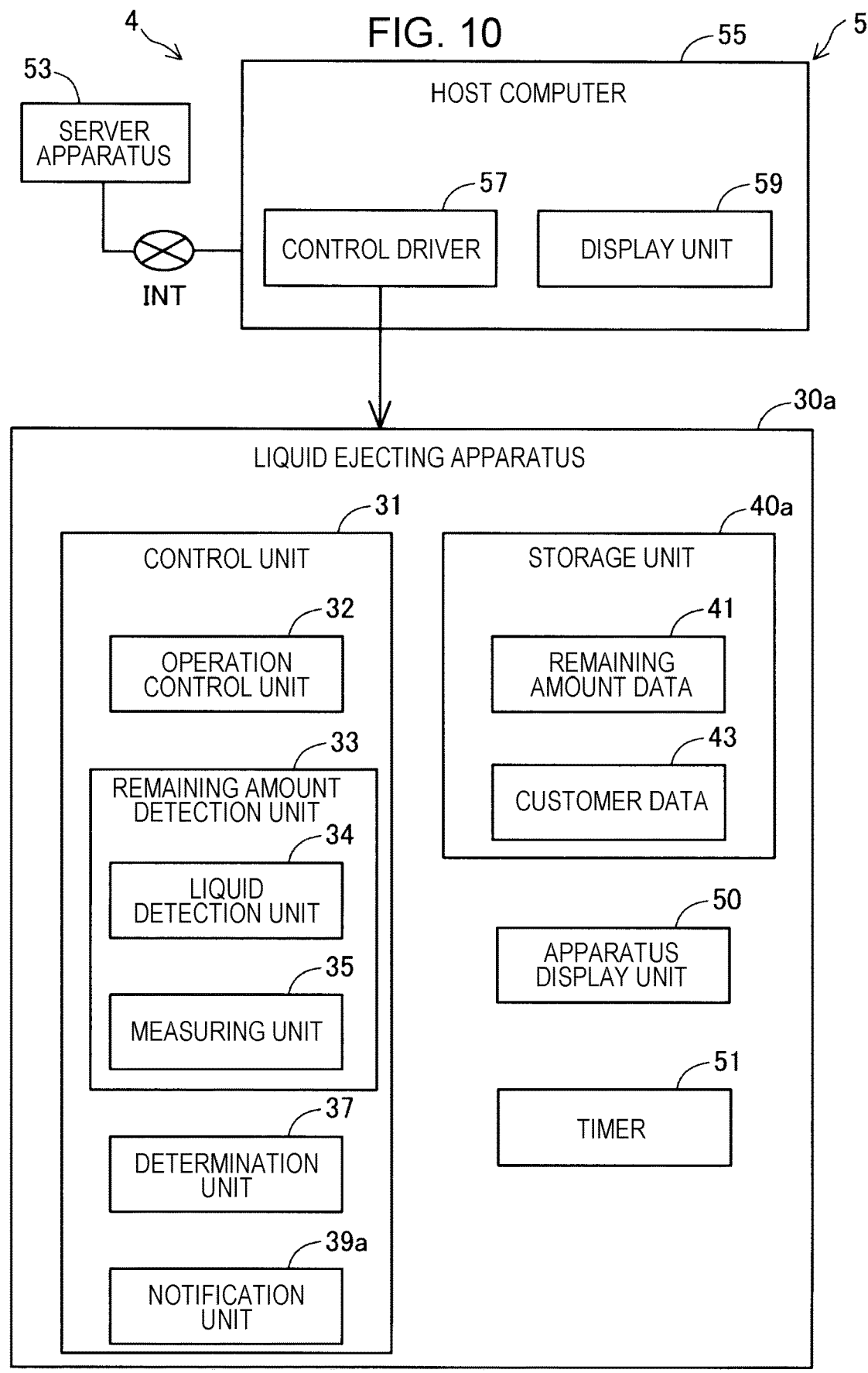
FIG. 10 is a diagram for explaining an ordering system of the present disclosure.

FIG. 10 is a diagram for explaining an ordering system 4 of the present disclosure. The second embodiment is different from the first embodiment described above in that an server apparatus 53 is newly provided, the liquid ejecting apparatus 30a includes a notification unit 39a and a storage unit 40a, and the liquid ejecting apparatus 30a has a timer 51. The other components are the same as those of the first embodiment, so that the same components are denoted by the same reference numerals and their description is omitted.

The ordering system 4 is a system for ordering the refilling container 90. The ordering system 4 includes the host computer 55, the liquid ejecting apparatus 30a and the server apparatus 53. The server apparatus 53 is communicably coupled to the host computer 55 through the Internet INT. The server apparatus 53 accept an order for the refilling container 90 for refilling the liquid container 45 of the liquid ejecting apparatus 30 with liquid by receiving an instruction from the host computer 55.

The storage unit 40a of the liquid ejecting apparatus 30a has customer data 43. The customer data 43 is data related to purchase of the refilling container 90 of a user of the liquid ejecting apparatus 30a. Specifically, the customer data 43 is data indicating whether or not periodic purchase contract is concluded for each of the liquid containers 45C, 45M, 45Y, and 45K. The customer data 43 may include purchase history data of the refilling container 90 in addition to the data of periodic purchase. The customer data 43 may be updated through the server apparatus 53. The timer 51 measures the current date and time.

FIG. 11 is a diagram for explaining the customer data 43. The customer data 43 stores the model number of the refilling container 90, the presence or absence of periodic purchase, a shipping date of the refilling container 90 from a maker when the periodic purchase is performed, and the number of refilling containers 90 for periodic purchase, for each ink color. In the present embodiment, the user does not conclude a periodic purchase contract for the refilling container 90 of the black ink and concludes a periodic purchase contract for the refilling containers 90 of the yellow ink, the magenta ink, and the cyan ink. In the present embodiment, the periodic purchase contract is a contract where one refilling container 90 for each color is shipped to the user on the 20th of each month.

Figure 12:
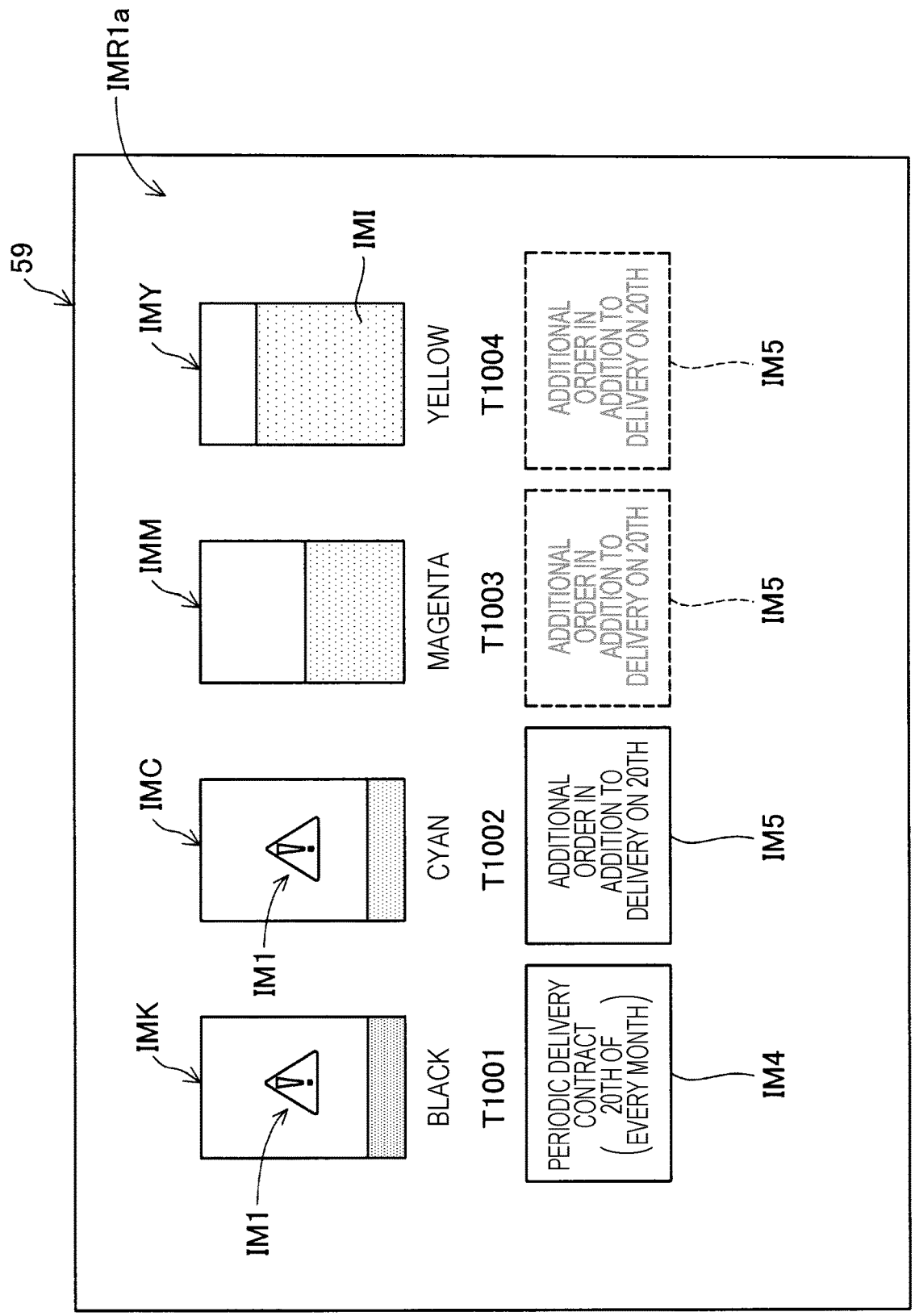
FIG. 12 is a diagram showing a state display image displayed on the display unit.

FIG. 12 is a diagram showing a state display image IMR1a displayed on the display unit 59. In this example, a case will be described where the determination unit 37 determines that the liquid container 45K that stores black ink and the liquid container 45C that stores cyan ink are in the first state which is an ink low state. The notification unit 39a causes the display unit 59 to display the state display image IMR1a through the control driver 57. The state display image IMR1a includes the first container image IMK to the fourth container image IMY, the remaining amount display image IMI, the first state image IM1, a first button IM4, and a second button IM5.

The first button IM4 is a button for periodically purchasing the refilling container 90. The notification unit 39a causes the display unit 59 to display the first button IM4 in association with the first container image IMK through the control driver 57 in a third case where the notification unit 39a causes the display unit 59 to notify whether the liquid container 45 to be an object, which is the liquid container 45K here, is in the first state or in the second state. Thereby, when the liquid container 45 becomes either the first state or the second state, it is possible to prompt the user to periodically purchase the refilling container 90. The first button IM4 is displayed below the first container image IMK in order to associate the first button IM4 with the first container image IMK representing the liquid container 45K to be an object of periodic purchase. Thereby, it is possible to reduce the possibility that the user erroneously purchases a refilling container 90 of a liquid container 45 different from the refilling container 90 to be periodically purchased. The first button IM4 includes a frame image and an image showing content of periodic purchase inside the frame image. When the user selects the first button IM4, a website for concluding a periodic purchase contract is displayed on the display unit 59.

On the other hand, the notification unit 39a causes the display unit 59 to display the second button IM5 through the control driver 57 in the third case in which the liquid container 45C storing cyan ink where a periodic purchase contract is concluded becomes the first state or the second state and in a state in which a predetermined condition is satisfied. The second button IM5 is a button for additionally purchasing the refilling container 90 separately from the periodic purchase. Thereby, it is possible to prompt the user to purchase the refilling container 90 different from the periodic purchase. The second button IM5 is displayed in association with the second container image IMK that represents the liquid container 45C. For example, the second button IM5 is displayed below the second container image IMC representing the liquid container 45C for which the refilling container 90 is separately purchased. Thereby, it is possible to reduce the possibility that the user erroneously purchases a refilling container 90 different from the refilling container 90 to be purchased. The second button IM5 includes a frame image and an image indicating an additional purchase inside the frame image. When the user selects the second button IM5, a website for concluding an additional purchase contract is displayed on the display unit 59. It is preferable that the predetermined condition is a condition that can prevent the liquid remaining amount from being the second state, which is an ink end state, during a period from when the liquid remaining amount becomes the first state until when an additionally purchased refilling container 90 is delivered to the user. For example, the predetermined condition is a condition where a day when the first condition occurs is several days, for example, five days before the refilling container 90 is periodically delivered.

The second button IM5 corresponding to the third container image IMM and the fourth container image IMY is displayed on the display unit 59 at a time point when the third container image IMM and/or the fourth container image IMY become the first state.

According to the second embodiment described above, the second embodiment has the same configuration as that of the first embodiment, so that the second embodiment achieves the same effect as that of the first embodiment. For example, it is possible to reduce a risk of giving the user a sense of uneasiness that the liquid container 45 is not sufficiently refilled with liquid and a sense of uneasiness that there is a risk that the liquid overflows from the inlet port 42 during refilling of liquid. Further, according to the second embodiment described above, the user can easily perform periodic purchase or additional purchase of the refilling container 90 to be an object by selecting the first button IM4 or the second button IM5. Thereby, it is possible to reduce the possibility that the user erroneously purchases the refilling container 90 that does not correspond to the liquid container 45.

C. Third Embodiment

Figure 13:
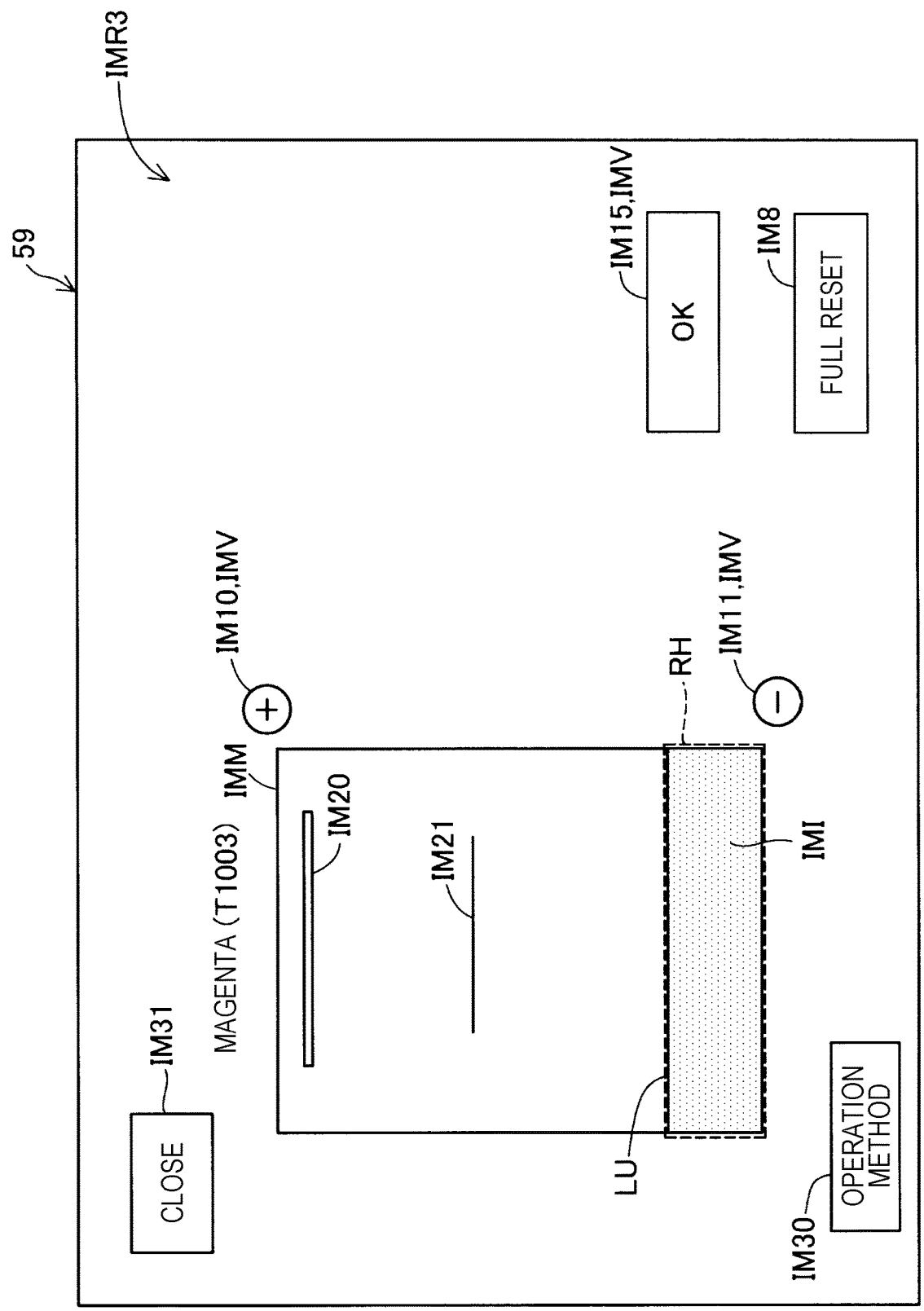
FIG. 13 is a first diagram for explaining a third embodiment.
Figure 14:
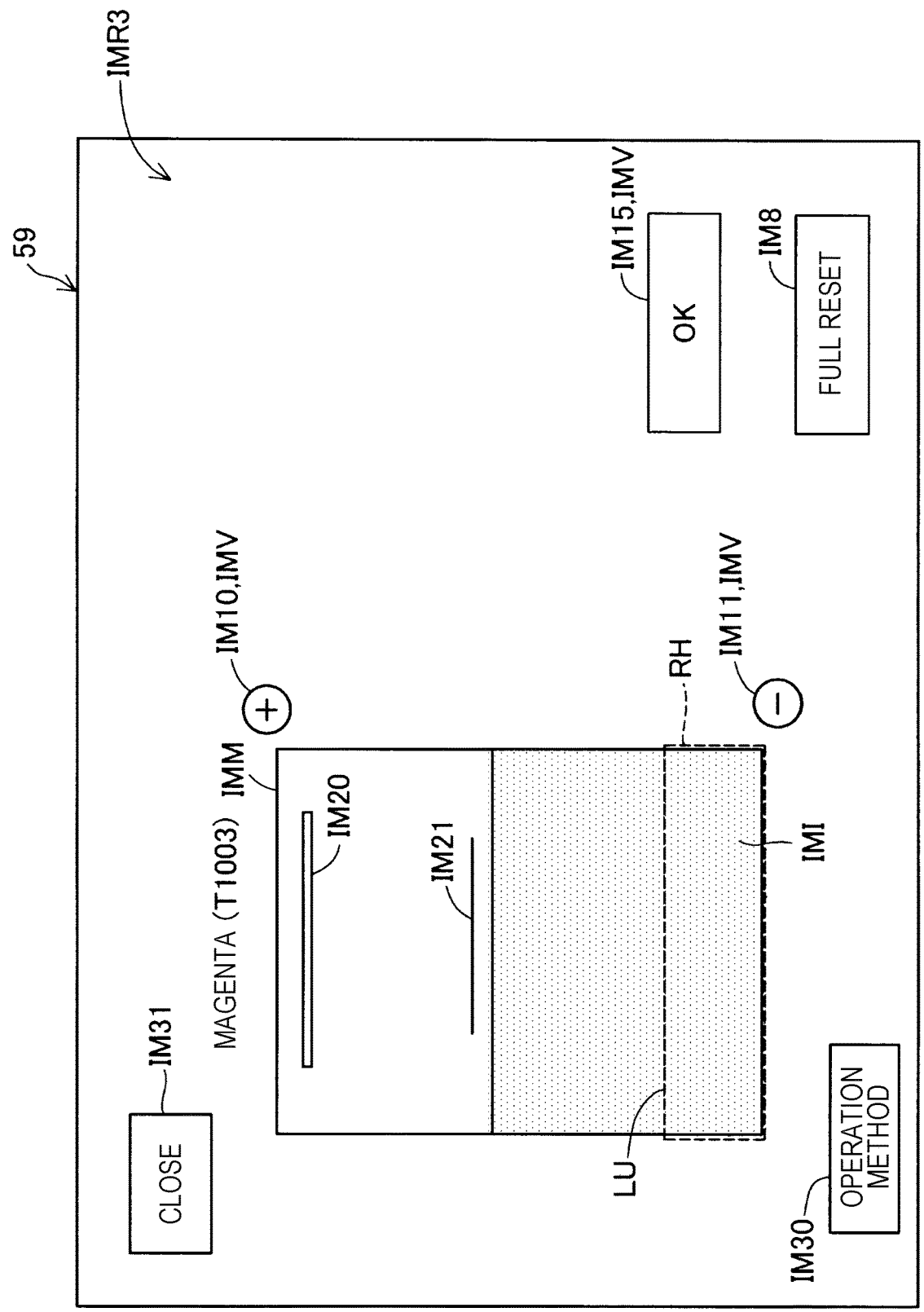
FIG. 14 is a second diagram for explaining the third embodiment.

FIG. 13 is a first diagram for explaining the third embodiment. FIG. 14 is a second diagram for explaining the third embodiment. In the third embodiment, when there is a difference between the display of the liquid remaining amount in the liquid container 45 displayed on the display unit 59 and the liquid remaining amount visually checked by the user, it is possible to modify the display content of the liquid remaining amount. The third embodiment can be applied to the first embodiment and the second embodiment.

For example, the user selects a container image, in which the user wants to modify the display content of the liquid remaining amount, from the first to fourth container images IMK to IMY in the state display image IMR1 shown in FIG. 8. For example, the third container image IMM corresponding to the magenta liquid container 45M. In this case, as shown in FIG. 13, the display unit 59 displays a remaining amount modification image IMR3 according to an instruction of the control driver 57. The remaining amount modification image IMR3 includes the remaining amount display image IMI representing the detected remaining amount which is the detection result of the remaining amount detection unit 33, a modification receiving section IMV that receives modification of the remaining amount display image IMI by the user, the first container image IMK which is an example of the container image, an operation method image IM30, an end image IM31, and a refilling completion image IM8.

The end image IM31 receives an instruction for ending the display of the remaining amount modification image IMR3. When the end image IM31 is selected, the display of the remaining amount modification image IMR3 is ended. The operation method image IM30 receives an instruction for displaying an operation method for modifying the display content of the liquid remaining amount. When the operation method image IM30 is selected, the operation method is displayed on the display unit 59.

The modification receiving section IMV includes an amount increase receiving image IM10, an amount decrease receiving image IM11, and a decision image IM15. The amount increase receiving image IM10 is used when increasing the remaining amount represented by the remaining amount display image IMI. Every time the amount increase receiving image IM10 is selected, an upper side LU of the remaining amount display image IMI is displaced upward so that the remaining amount display image IMI is enlarged by a predetermined area. The amount decrease receiving image IM11 is used when decreasing the remaining amount represented by the remaining amount display image IMI. Every time the amount decrease receiving image IM11 is selected, the upper side LU of the remaining amount display image IMI is displaced downward so that the remaining amount display image IMI is reduced by a predetermined area. It is possible to change the liquid remaining amount represented by the state display image IMR1 in a plurality of stages by selecting the amount increase receiving image IM10 and the amount decrease receiving image IM11. For example, as shown in FIG. 14, when the amount increase receiving image IM10 is selected a plurality of times, the remaining amount display image IMI is modified so that the upper side LU is located higher than that of the remaining amount display image IMI shown in FIG. 8 or FIG. 13.

The decision image IM15 receives storage of the modified remaining amount display image IMI. When the decision image IM15 is selected, the control driver 57 stores the modified remaining amount display image IMI into a storage unit of the host computer 55. Thereby, the control driver 57 also displays the modified remaining amount display image IMI on the state display images IMR1 and IMR1a. Further, the control driver 57 transmits update information indicating that the decision image IM15 is selected to the control unit 31. Further, when the control unit 31 receives the update information, the remaining amount detection unit 33 of the liquid ejecting apparatus 30 updates the remaining amount corresponding to the modified remaining amount display image IMI as a modified remaining amount from the remaining amount data 41 indicating the current liquid remaining amount, and stores the modified remaining amount into the storage unit 40.

The remaining amount modification image IMR3 further includes an intermediate image IM21 substantially indicating the liquid remaining amount and an upper limit image IM20 schematically indicating the position of the upper limit mark 80. The intermediate image IM21 is an image representing a horizontal line and becomes a substantial indication for modifying the liquid remaining amount. A plurality of intermediate images IM21 may be provided at different height positions with constant intervals between them. The intermediate image IM21 is displayed between the lower side of the first container image IMK and the upper limit image IM20. In the remaining amount display image IMI that can be modified in a plurality of stages, in one stage, the upper side LU is displayed to be superimposed on the intermediate image IM21. The intermediate image IM21 is displayed, so that the user can more easily modify the remaining amount modification image IMR3 to correspond to an actual liquid remaining amount in the liquid container 45. The upper limit image IM20 is a line image indicating the liquid remaining amount at 100%. In a case where the refilling completion image IM8 is selected or the like, the control driver 57 superimposes the upper side LU on the upper limit image IM20.

Depending on the specifications of the liquid ejecting apparatuses 30 and 30a, a visual recognition impossible area where a part of lower portion of the liquid container 45 cannot be visually recognized from the outside may be generated. For example, when the window sections 24 are small or the liquid container unit 60 is arranged inside the apparatus main body 49 of the liquid ejecting apparatuses 30 and 30a, the visual recognition impossible area may be generated. In this case, the display unit 59 may display the remaining amount display image IMI so that liquid remains in an area RH corresponding to the visual recognition impossible area. Thereby, it is possible to reduce the possibility to cause the user to misunderstand that there is no liquid remaining amount even though there is a liquid remaining amount. The area RH is set so that the user cannot modify the area RH. In the visual recognition impossible area, the liquid level Lf where the liquid can be detected by using the detection member 70, that is, the liquid remaining amount when the liquid level Lf is located at the height H13 or H12 shown in FIG. 7, may be displayed by the remaining amount display image IMI.

According to the third embodiment described above, when the modification of the liquid remaining amount is received by the modification receiving section IMV, the display unit 59 updates the liquid remaining amount to a modified remaining amount that is a remaining amount that has been modified and displays the remaining amount display image IMI, and the remaining amount detection unit 33 stores the modified remaining amount into the storage unit 40 as a remaining amount. Thereby, when there is a difference between the liquid remaining amount indicated by the remaining amount display image IMI and the actual remaining amount in the liquid container 45, it is possible to modify the display content of the remaining amount display image IMI.

The control driver 57 may cause the display unit 59 to display the second button IM5 for the container image whose remaining amount is updated after the remaining amount display image IMI is updated to the modified remaining amount. In other words, when the user selects the decision image IM15 after operating the amount increase receiving image IM10 and/or the amount decrease receiving image IM11, the control driver 57 may cause the display unit 59 to display the second button IM5 on the remaining amount modification image IMR3. Thereby, it is possible to prompt the user to additionally purchase the refilling container 90 that is necessary for the refilling even when the user modifies the liquid remaining amount to a liquid remaining amount smaller than that before the modification.

In the third embodiment, when the amount increase receiving image IM10 and/or the amount decrease receiving image IM11 are selected, the height position of the upper side LU is changed, so that the liquid remaining amount indicated by the remaining amount display image IMI can be modified. However, it is not limited to this. For example, in the container image on the remaining amount modification image IMR3, for example, the first container image IMK, the user selects a position by moving a cursor to a position closest to the liquid level Lf of the actual liquid container 45K. Thereby, the control driver 57 may displace the upper side LU to the selected position or a stage close to the selected position. By doing so, it is possible to improve operability of the user to modify the remaining amount display image IMI. In the first container image IMK, when a position higher than the upper limit image IM20 is selected, the upper side LU is displaced so as to be superimposed on the upper limit image IM20.

When the liquid container 45 of the liquid ejecting apparatuses 30 and 30a does not have the detection member 70, the control driver 57 need not cause the display unit 59 to display the area RH corresponding to the visual recognition impossible area, and when the liquid level Lf reaches the area RH, the remaining amount display image IMI may be prevented from being displayed so as to indicate that the remaining amount is 0%. Thereby, it is possible to avoid a situation that a difference occurs between the display content of the remaining amount display image IMI and the liquid level Lf of the liquid container 45 that can be actually visually recognized, so that it is possible to prompt the user to check the liquid level Lf through the window sections 24.

D. Other Embodiments

D-1. First Another Embodiment

In each embodiment described above, the ordering system 4 may include a reward system that gives a reward to a user who periodically purchases the refilling container 90 or additionally purchases the refilling container 90. A container identification code for specifying the refilling container 90 is assigned to each refilling container 90 in advance. For example, the container identification code is composed of a plurality of alphanumeric characters. A label where the container identification code is written is attached to the refilling container 90. The display unit 59 can display an input website where a user who periodically purchases the refilling container 90 or additionally purchases the refilling container 90 inputs the container identification code. When the user inputs a user identification code previously assigned to the user and the container identification code, a point is given in association with the user identification code. Various benefits are given to the user according to the points. The benefits are, for example, a purchase of the liquid ejecting apparatus 30 or 30a at a discount price and a purchase of the refilling container 90 at a discount price.

D-2. Second Another Embodiment

In each embodiment described above, the detection member 70 is a prism. However, the detection member 70 is not limited to a prism, and the presence or absence of liquid may be detected by using another detection member. For example, the detection member 70 may be a sensor using two electrodes or may be a piezoelectric vibration element. When the detection member 70 is two electrodes, the liquid detection unit 34 detects the presence or absence of liquid according to, for example, an electric current value flowing between the two electrodes or an electrostatic capacity between the two electrodes. When the detection member 70 is a piezoelectric vibration element, the liquid detection unit 34 detects the presence or absence of liquid according to residual vibration of the piezoelectric vibration element. In each embodiment described above, the liquid container 45 includes the detection member 70. However, the detection member 70 may be omitted. In this case, the remaining amount detection unit 33 detects the liquid remaining amount by using the measuring result of the measuring unit 35.

D-3. Third Another Embodiment

In each embodiment described above, the liquid container 45 is arranged in a position different from a carriage having the head 17. However, the liquid container 45 may be mounted in the carriage. In this case, the liquid ejecting apparatuses 30 and 30a are provided with an openable and closable lid, and when the lid is opened, the liquid container 45 is exposed. The user refills the exposed liquid container 45 with liquid by using the refilling container 90.

D-4. Fourth Another Embodiment

In each embodiment described above, an automatic stop mechanism may be provided that stops liquid injection from the refilling container 90 before the liquid overflows from the liquid container 45 when the liquid is injected from the refilling container 90 to the liquid container 45. The automatic stop mechanism may be a mechanism that stops liquid injection by using a water head pressure relationship. Specifically, the refilling container 90 is designed so that the tip of the delivery port 92 is located between the lower end line 82 of the upper limit mark 80 and the inner surface of the upper wall 48 when the delivery port 92 of the refilling container 90 is inserted into the inlet port 42 and the liquid is flowed into the storage portion 431 of the liquid container 45 by its own weight. In this case, when the liquid is injected into the storage portion 431, air in the storage portion 431 is discharged to the outside through a gap formed between the inlet port 42 and the refilling container 90. When the liquid level Lf reaches the inlet port 42, the liquid in the refilling container 90 cannot fall in drops by its own weight because gas-liquid exchange cannot be performed, so that the injection of the liquid is automatically stopped. After the automatic stop mechanism functions, there is liquid injected into the inlet port 42 when the refilling container 90 is removed from the inlet port 42. For example, there is a case where the liquid existing in the delivery port 92 falls in drops because of gravity. Therefore, when an amount obtained by adding the amount of the liquid injected into the inlet port 42 when the refilling container 90 is removed from the inlet port 42 to the amount of the liquid injected until the automatic stop mechanism functions is stored in the storage portion 431, the liquid level Lf may be located between the height H82 and the height H21. Further, for example, in a case in which the liquid container 45 has a liquid flow path extending in the Z direction in which the inlet port 42 and the storage portion 431 are coupled, when the refilling container 90 is removed from the inlet port 42 after the automatic stop mechanism functions, the liquid existing in the liquid flow path flows into the storage portion 431. Therefore, when an amount obtained by adding the amount of the liquid existing in the liquid flow path to the amount of the liquid injected into the storage portion 431 until the automatic stop mechanism functions is stored in the storage portion 431, the liquid level Lf may be located between the height H82 and the height H21.

D-5. Fifth Another Embodiment

In each embodiment described above, the determination unit 37 determines whether the liquid remaining amount in the storage portion 431 is in the first state where the liquid remaining amount is smaller than or equal to the first threshold value or in the second state where the liquid remaining amount is smaller than or equal to the second threshold value by using the detection result of the remaining amount detection unit 33. However, the first state and the second state may be determined based on a liquid consumption amount in the storage portion 431. For example, the determination unit 37 may determine whether the liquid remaining amount is in the first state or in the second state based on the liquid consumption amount in the storage portion 431 calculated by the measuring unit 35 of the remaining amount detection unit 33. In this case, whether the liquid remaining amount is smaller than or equal to the first threshold value or smaller than or equal to the second threshold value may be determined by using a first consumption threshold value that is a threshold value of the liquid consumption amount corresponding to the first threshold value of the liquid remaining amount and a second consumption threshold value that is a threshold value of the liquid consumption amount corresponding to the second threshold value of the liquid remaining amount. The second consumption threshold value is greater than the first consumption threshold value.

D-6. Sixth Another Embodiment

Figure 15:
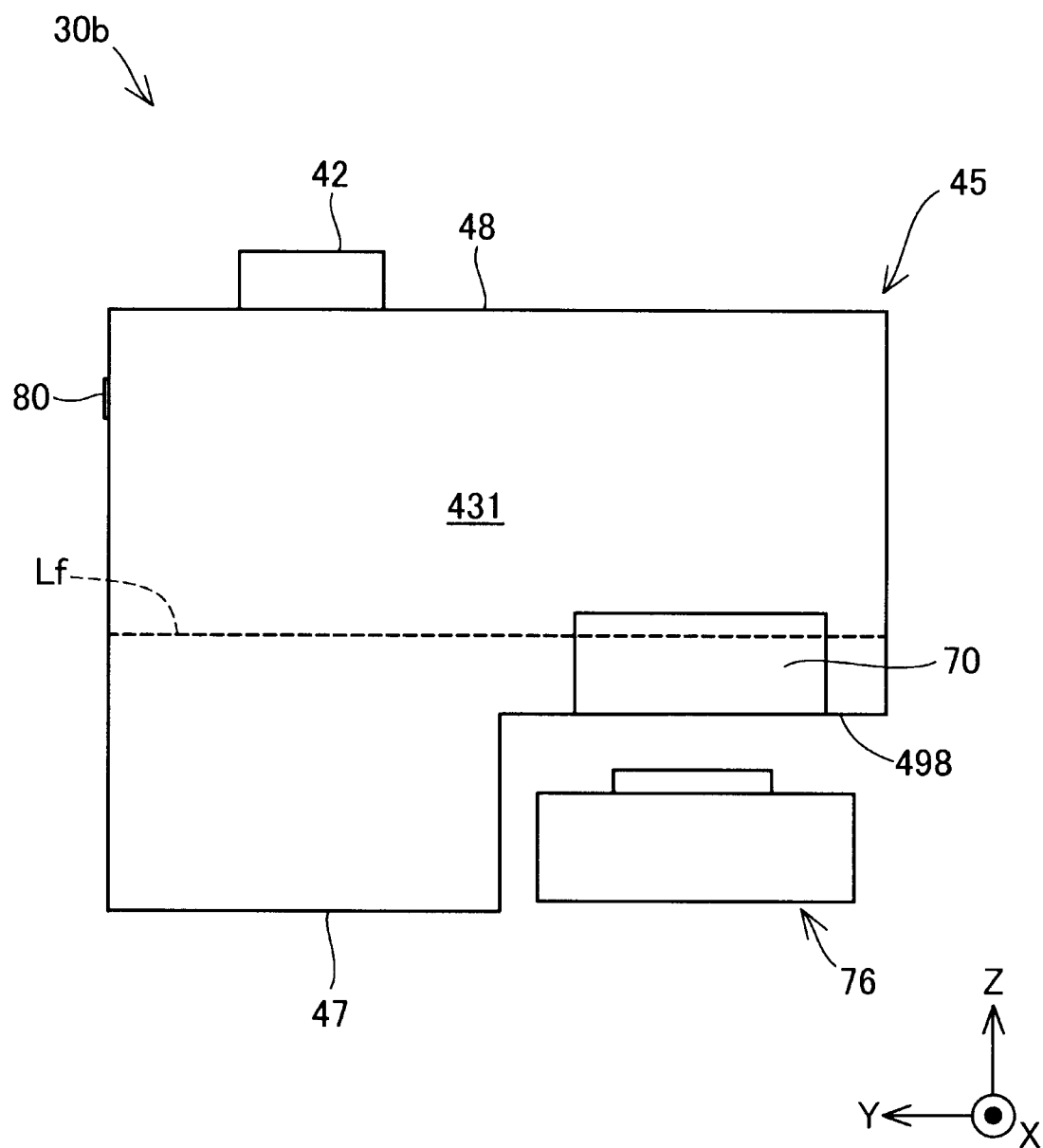
FIG. 15 is a diagram for explaining an on-carriage type liquid ejecting apparatus.

In each embodiment described above, the liquid ejecting apparatuses 30 and 30a may be an on-carriage type where the liquid containers 45 are arranged on the carriage having the head 17. A schematic configuration of an on-carriage type liquid ejecting apparatus 30b will be described below. FIG. 15 is a diagram for explaining an on-carriage type liquid ejecting apparatus. A support member 498 is a wall located in the +Z direction of the bottom wall 47. That is, the bottom wall 47 and the support member 498 form a level difference. The liquid containers 45 are arranged on the carriage having the head 17 not shown in the drawings. Thereby, the liquid containers 45 are arranged inside the apparatus main body 49. The carriage can reciprocate along the X direction. The liquid container 45 has the inlet port 42, the detection member 70, the upper limit mark 80, and the liquid delivery member 331 not shown in the drawings, in the same manner as in each embodiment described above. The optical detection unit 76 is fixed in a position lower than the prism 70. When detecting the liquid remaining amount, the carriage moves, so that each prism 70 of each liquid container 45 passes over the optical detection unit 76. At this time, the liquid remaining amount is detected by using the light emitting element 77 and the light receiving element 78.

Figure 16:
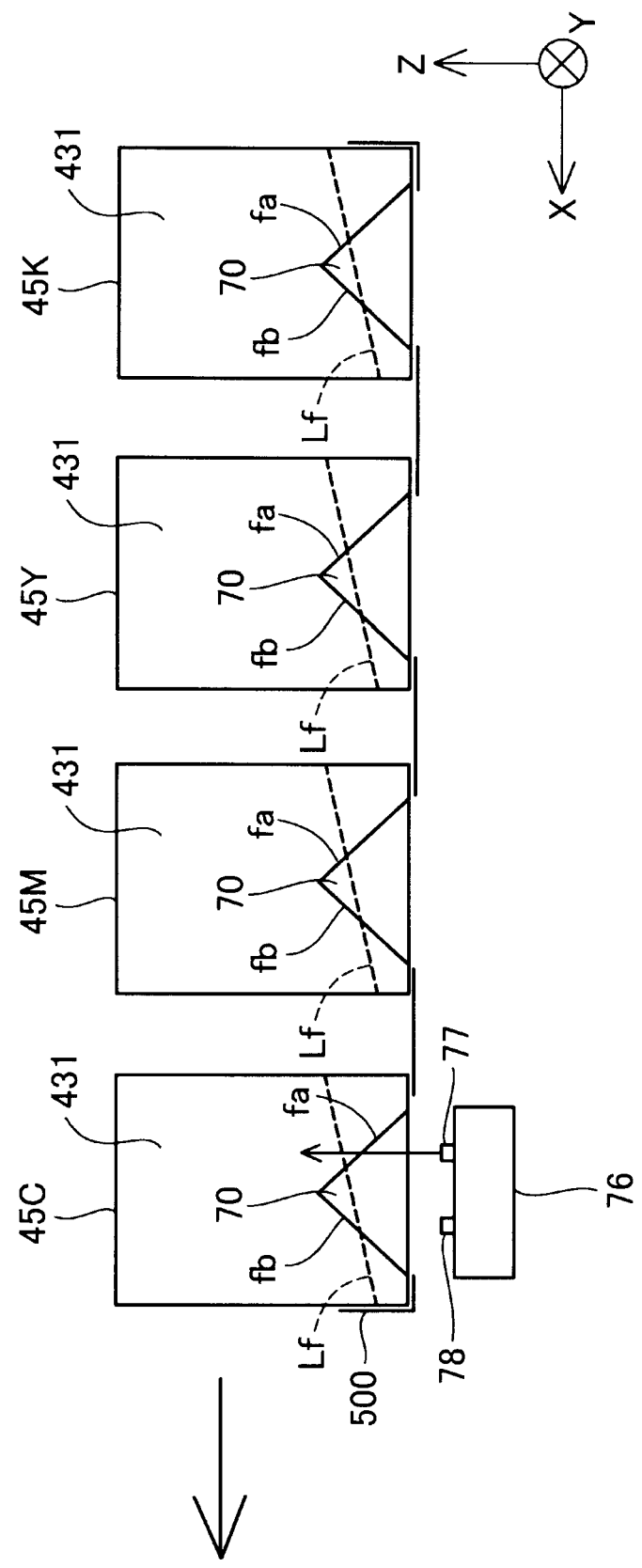
FIG. 16 is a first diagram for explaining detection of the liquid remaining amount using an optical detection unit.

FIG. 16 is a first diagram for explaining the detection of the liquid remaining amount using the optical detection unit 76. FIG. 17 is a second diagram for explaining the detection of the liquid remaining amount using the optical detection unit 76. As shown in FIG. 16, when detecting the liquid remaining amount, a carriage 500 moves in one direction of the X direction, that is, for example, in the +X direction. Here, the carriage 500 is designed to be accelerated until a moving speed becomes a predetermined value, so that when the carriage 500 is accelerated, the liquid level Lf of the storage portion 431 of each of the liquid containers 45C, 45M, 45Y, and 45K is inclined by an inertia force. Specifically, regarding surfaces fa and fb of the detection member 70, the liquid level Lf is inclined so that the liquid level Lf on a surface fa side irradiated with the light emitted from the light emitting element 77 is higher than the liquid level Lf on a reflection surface fb side which guides the light to the light receiving element 78. While the carriage 500 is being accelerated, remaining amount detection using the optical detection unit 76 is performed in the three liquid containers 45C, 45M, and 45Y. On the other hand, as shown in FIG. 17, the liquid container 45K that lastly passes over the optical detection unit 76 is not accelerated because the moving speed of the carriage 500 reaches the predetermined value. Therefore, when the remaining amount detection of the liquid container 45K is performed using the optical detection unit 76, the liquid level Lf of the liquid container 45 becomes horizontal. As a result, even when the liquid levels Lf of the liquid containers 45C, 45M, 45Y, and 45K are located at the same height when the carriage 500 stands still, the following phenomenon occurs. When the liquid remaining amount is detected by the optical detection unit 76, the heights of the liquid level Lf around the surface fa of the liquid containers 45C, 45M, and 45Y are higher than the height of the liquid level Lf around the surface fa of the liquid container 45K. When the carriage 500 is not accelerated or decelerated, as shown in FIG. 17, there is no liquid on the surfaces fa and fb, more specifically, at positions where a light path from the light emitting element 77 to the light receiving element 78 crosses the surfaces fa and fb. On the other hand, as shown in FIG. 16, while the carriage 500 is being accelerated, there is liquid at a position where the light path crosses the surface fb. Thereby, regarding the liquid container 45K, the liquid detection unit 34 detects that there is no liquid remaining amount in the liquid container 45K when the liquid remaining amount in the liquid container 45K is greater than those of the other liquid containers 45C, 45M, and 45Y. That is, regarding the liquid container 45K, the liquid detection unit 34 detects that there is no liquid remaining amount when the liquid remaining amount is greater than the first threshold value. In other words, regarding the liquid container 45K, the liquid detection unit 34 detects that there is no liquid remaining amount in the liquid container 45K at a timing earlier than those for the other liquid containers 45C, 45M, and 45Y.

D-7. Seventh Another Embodiment

The present disclosure can be applied not only to an ink jet printer and a refilling container used for a liquid container, but also to any liquid consumption apparatus that ejects liquid other than ink and its refilling container. For example, the present disclosure can be applied to various liquid ejecting apparatuses as follows:
(1) An image recording apparatus such as a facsimile apparatus
(2) A color material ejecting apparatus used for manufacturing a color filter for an image display apparatus such as a liquid crystal display
(3) An electrode material ejecting apparatus used for forming electrodes of an organic EL (Electro Luminescence) display, a surface light emission display (Field Emission Display, FED), and the like
(4) A consumables consumption apparatus that ejects liquid containing living organic material used for manufacturing biochip
(5) A sample injection apparatus as a precision pipette
(6) A lubricating oil injection apparatus
(7) A resin liquid injection apparatus
(8) A liquid ejecting apparatus that ejects lubricating oil to a precision machine such as a watch and a camera in a pinpoint manner
(9) A liquid ejecting apparatus that ejects transparent resin liquid such as ultraviolet curing resin liquid onto a substrate for forming hemispherical microlenses (optical lenses) or the like used for an optical communication element and the like
(10) A liquid ejecting apparatus that ejects acidic or alkaline etching liquid in order to etch a substrate and the like
(11) A liquid ejecting apparatus including a head that discharges a very small amount of other arbitrary droplets The "droplet" means a state of the liquid discharged from the liquid ejecting apparatus, and the "droplet" includes a liquid having a granular shape, a tear-drop shape, and a shape that leaves a tail like a string. The "liquid" mentioned here may be any kind of material that can be ejected from the liquid ejecting apparatus. For example, the "liquid" may be any material that is in a liquid phase, and examples of the "liquid" include liquid-state materials having a high or low viscosity, a sol, gel water, another inorganic solvent, an organic solvent, a solution, a liquid resin, and a liquid metal (metal melt). Furthermore, the examples of the "liquid" include not only liquid, as one state of materials, but also materials in which solvent contains dissolved, dispersed, or mixed particles of a functional material made of a solid, such as pigments or metal particles. Representative examples of the liquid include ink such as that described in the foregoing embodiments, liquid crystal, or the like. Here, the "ink" encompasses general water-based ink and oil-based ink, as well as various types of liquid compositions such as gel ink and hot melt-ink.

E. Other Forms

The present disclosure is not limited to the embodiments described above, but can be implemented in various forms without departing from the scope of the disclosure. For example, the present disclosure can be realized by the forms described below. The technical features in the embodiments described above corresponding to the technical features in each form described below can be appropriately replaced and combined in order to solve some or all of the problems of the present disclosure or in order to achieve some or all of the effects of the present disclosure. The technical features can be appropriately deleted if the technical features are not described to be essential in the present specification.

(1) According to one form of the present disclosure, a liquid ejecting apparatus is provided. The liquid ejecting apparatus includes a head that discharges liquid, a liquid container that supplies the liquid to the head, and a control unit that controls operation of the liquid ejecting apparatus. The liquid container has a storage portion that can store the liquid, an inlet port for injecting the liquid of a refilling container different from the liquid container from the refilling container to the storage portion, and an upper limit mark that indicates an upper limit of a liquid level of the liquid stored in the storage portion. The control unit has a remaining amount detection unit that detects a remaining amount of the liquid stored in the storage portion, a determination unit that determines whether the remaining amount of the liquid in the storage portion is in a first state where the remaining amount is smaller than or equal to a first threshold value or in a second state where the remaining amount is smaller than or equal to a second threshold value smaller than the first threshold value by using a detection result of the remaining amount detection unit, and a notification unit that notifies outside whether the remaining amount is in the first state or in the second state according to a determination result of the determination unit. The upper limit mark is arranged so that in a first case where an entire amount of the liquid stored in the refilling container is injected into the storage portion when the notification unit notifies of the first state, a liquid level of the liquid in the storage portion is located between the inlet port and the upper limit mark, and in a second case where the entire amount of the liquid stored in the refilling container is injected into the storage portion when the notification unit notifies of the second state, the liquid level overlaps with the upper limit mark.

According to this form, even when the liquid container is refilled with the entire amount of the liquid in the refilling container in the first state, the liquid does not overflow from the inlet port, and even when the liquid container is refilled with the entire amount of refilling liquid in the second state, the liquid level overlaps with the upper limit mark. Thereby, it is possible to reduce a risk of giving a user a sense of uneasiness that the liquid container is not sufficiently refilled with liquid and a sense of uneasiness that there is a risk that the liquid overflows from the inlet port during refilling of liquid.

(2) In the form described above, the liquid container may further have a detection member that is used to detect the presence or absence of the liquid, and the remaining amount detection unit may have a liquid detection unit that detects the presence or absence of the liquid stored in the storage portion by using the detection member and a measuring unit that measures an amount of liquid discharged from the head.

According to this form, it is possible to more accurately detect the remaining amount of liquid in the liquid container by using detection of the presence or absence of the liquid using the detection member and measurement of the amount of liquid discharged from the head using the measuring unit.

(3) In the form described above, the determination unit may determine the first state by using a detection result of the liquid detection unit and may determine the second state by using the detection result of the liquid detection unit and a measuring result of the measuring unit.

According to this form, it is possible to determine the first state by using the detection result of the liquid detection unit and determine the second state by using the detection result of the liquid detection unit and the measuring result of the measuring unit.

(4) In the form described above, the determination unit may determine whether the remaining amount is in the first state or in the second state by using the detection result of the liquid detection unit and a measuring result of the measuring unit.

According to this form, it is possible to determine whether the remaining amount is in the first state or in the second state by using the detection result of the liquid detection unit and the measuring result of the measuring unit.

(5) In the form described above, the detection member may be arranged in a position where the determination unit can determine the first state so that the liquid level is located between the inlet port and the upper limit mark when a maximum storage amount of the liquid in the refilling container is injected into the storage portion in the first case.

According to this form, when injecting liquid into the liquid container in a case where the liquid container becomes the first state, even if the maximum storage amount of liquid is injected due to the tolerance from the refilling container to the storage portion, it is possible to reduce the possibility that the liquid overflows from the inlet port.

(6) In the form described above, a plurality of the liquid containers may be included, and the determination unit may determine the second state of each of the plurality of liquid containers based on the remaining amount of the liquid in a specific liquid container whose liquid level height in the storage portion is lowest at a time point when the liquid detection unit detects that there is no liquid, among the plurality of liquid containers.

According to this form, in the plurality of the liquid containers, it is possible to suppress variation of the liquid remaining amount at a time point when it is determined to be in the second state.

(7) According to another form of the present disclosure, an ordering system of a refilling container that refills a liquid container of a liquid ejecting apparatus with liquid is provided. The ordering system includes the liquid ejecting apparatus of the form described above, a display unit that displays the state of the liquid container, and a control driver that controls operations of the display unit and the liquid ejecting apparatus. The notification unit causes the display unit to display a first button for periodically purchasing the refilling container through the control driver in a third case where the notification unit causes the display unit to notify whether the state is the first state or the second state through the control driver.

According to this form, when the liquid container becomes either the first state or the second state, it is possible to prompt the user to periodically purchase the refilling container for refilling the liquid container with liquid.

(8) In the form described above, the display unit may display the first button in association with a container image representing the liquid container to be periodically purchased.

According to this form, it is possible to reduce the possibility that the user erroneously purchases a refilling container different from the refilling container to be periodically purchased.

(9) In the form described above, in the third case, the display unit may display the second button for purchasing the refilling container separately from the periodic purchase.

According to this form, it is possible to prompt the user to purchase the refilling container different from the periodic purchase.

(10) In the form described above, the display unit may display the second button in association with a container image representing the liquid container for which the refilling container is purchased separately from the periodic purchase.

According to this form, it is possible to reduce the possibility that the user erroneously purchases a refilling container different from the refilling container to be purchased.

(11) In the form described above, the liquid ejecting apparatus may further have a storage unit that stores the remaining amount of the liquid, which is a detection result of the remaining amount detection unit, as a detected remaining amount, the display unit may display a remaining amount display image that represents the detected remaining amount and a modification receiving section that receives modification of the remaining amount display image by a user, and when the modification is received by the modification receiving section, the display unit may update the remaining amount to a modified remaining amount that is the remaining amount where the modification is performed and display the remaining amount display image, and the remaining amount detection unit may store the modified remaining amount into the storage unit as the remaining amount.

According to this form, when there is a difference between the liquid remaining amount indicated by the remaining amount display image and the actual liquid remaining amount in the liquid container, it is possible to modify the display content of the remaining amount display image.

(12) In the form described above, the display unit may further display the second button after the remaining amount display image is updated to the modified remaining amount.

According to this form, for example, even when the user modifies the liquid remaining amount to a liquid remaining amount smaller than before the modification, it is possible to prompt the user to additionally purchase the refilling container that is necessary for the refilling.

The present disclosure can also be realized in a form other than the liquid ejecting apparatus and the ordering system described above. For example, the present disclosure can be realized in a form of a computer program or the like for realizing a manufacturing method of the liquid ejecting apparatus or the ordering system.

What is claimed is:

1. A liquid ejecting apparatus comprising:
a head that discharges liquid;
a liquid container that supplies the liquid to the head; and
a control unit that controls operation of the liquid ejecting apparatus, wherein the liquid container has a storage portion configured to store the liquid,
an inlet port for injecting the liquid of a refilling container different from the liquid container from the refilling container to the storage portion, and
an upper limit mark that indicates an upper limit of a liquid level of the liquid stored in the storage portion, the control unit has
a remaining amount detection unit that detects a remaining amount of the liquid stored in the storage portion,
a determination unit that determines whether the remaining amount of the liquid in the storage portion is in a first state where the remaining amount is smaller than or equal to a first threshold value or in a second state where the remaining amount is smaller than or equal to a second threshold value smaller than the first threshold value by using a detection result of the remaining amount detection unit, and
a notification unit that notifies outside whether the remaining amount is in the first state or in the second state according to a determination result of the determination unit, and the upper limit mark is arranged so that
in a first case where an entire amount of the liquid stored in the refilling container is injected into the storage portion when the notification unit notifies of the first state, a liquid level of the liquid in the storage portion is located between the inlet port and the upper limit mark, and
in a second case where the entire amount of the liquid stored in the refilling container is injected into the storage portion when the notification unit notifies of the second state, the liquid level overlaps with the upper limit mark.

2. The liquid ejecting apparatus according to claim 1, wherein
the liquid container further has a detection member that is used to detect the presence or absence of the liquid, and
the remaining amount detection unit has a liquid detection unit that detects presence or absence of the liquid stored in the storage portion by using the detection member and a measuring unit that measures an amount of liquid discharged from the head.

3. The liquid ejecting apparatus according to claim 2, wherein
the determination unit determines the first state by using a detection result of the liquid detection unit and determines the second state by using the detection result of the liquid detection unit and a measuring result of the measuring unit.

4. The liquid ejecting apparatus according to claim 2, wherein
the determination unit determines whether the remaining amount is in the first state or in the second state by using the detection result of the liquid detection unit and a measuring result of the measuring unit.

5. The liquid ejecting apparatus according to claim 2, wherein
the detection member is arranged in a position where the determination unit can determine the first state so that the liquid level is located between the inlet port and the upper limit mark when a maximum storage amount of the liquid in the refilling container is injected into the storage portion in the first case.

6. The liquid ejecting apparatus according to claim 2, wherein a plurality of the liquid containers are included, and
the determination unit determines the second state of each of the plurality of liquid containers based on the remaining amount of the liquid in a specific liquid container whose liquid level height in the storage portion is lowest at a time point when the liquid detection unit detects that there is no liquid, among the plurality of liquid containers.

7. An ordering system of a refilling container that refills a liquid container of a liquid ejecting apparatus with liquid, the ordering system comprising:
the liquid ejecting apparatus according to claim 1;
a display unit that displays the state of the liquid container; and
a control driver that controls operations of the display unit and the liquid ejecting apparatus, wherein
the notification unit causes the display unit to display a first button for periodically purchasing the refilling container through the control driver in a third case where the notification unit causes the display unit to notify whether the state is the first state or the second state through the control driver.

8. The ordering system according to claim 7, wherein
the display unit displays the first button in association with a container image representing the liquid container to be periodically purchased.

9. The ordering system according to claim 7, wherein
in the third case, the display unit displays the second button for purchasing the refilling container separately from the periodic purchase.

10. The ordering system according claim 9, wherein
the display unit further displays the second button after the remaining amount display image is updated to the modified remaining amount.

11. The ordering system according to claim 9, wherein
the display unit displays the second button in association with a container image representing the liquid container for which the refilling container is purchased separately from the periodic purchase.

12. The ordering system according to claim 11, wherein
the display unit further displays the second button after the remaining amount display image is updated to the modified remaining amount.

13. The ordering system according to claim 7, wherein
the liquid ejecting apparatus further has a storage unit that stores the remaining amount of the liquid, which is a detection result of the remaining amount detection unit, as a detected remaining amount,
the display unit displays a remaining amount display image that represents the detected remaining amount and a modification receiving section that receives modification of the remaining amount display image by a user, and
when the modification is received by the modification receiving section, the display unit updates the remaining amount to a modified remaining amount that is the remaining amount where the modification is performed and displays the remaining amount display image, and
the remaining amount detection unit stores the modified remaining amount into the storage unit as the remaining amount.

14. The ordering system according to claim 13, wherein
the display unit further displays the second button after the remaining amount display image is updated to the modified remaining amount.

* * * * *